US009709595B2

(12) United States Patent
Vohra et al.

(10) Patent No.: US 9,709,595 B2
(45) Date of Patent: Jul. 18, 2017

(54) METHOD AND APPARATUS FOR DETECTING LINEAR AND ROTATIONAL MOVEMENT

(71) Applicant: Analog Devices, Inc., Norwood, MA (US)

(72) Inventors: Gaurav Vohra, Norwood, MA (US); John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 582 days.

(21) Appl. No.: 14/080,370

(22) Filed: Nov. 14, 2013

(65) Prior Publication Data
US 2015/0128701 A1    May 14, 2015

(51) Int. Cl.
| | |
|---|---|
| *G01C 19/5698* | (2012.01) |
| *G01P 15/097* | (2006.01) |
| *G01C 19/5684* | (2012.01) |
| *G01P 15/18* | (2013.01) |
| *G01P 15/125* | (2006.01) |

(52) U.S. Cl.
CPC ........ *G01P 15/097* (2013.01); *G01C 19/5684* (2013.01); *G01P 15/125* (2013.01); *G01P 15/18* (2013.01)

(58) Field of Classification Search
CPC ............ G01C 19/5698; G01C 19/5684; G01P 15/097; G01P 15/125; G01P 15/18
USPC .............. 73/514.32, 514.29, 504.12, 504.13, 73/504.04
See application file for complete search history.

(56) References Cited

U.S. PATENT DOCUMENTS

| | | | |
|---|---|---|---|
| 3,656,354 A | 4/1972 | Lynch | 73/505 |
| 4,655,081 A | 4/1987 | Burdess | 73/505 |
| 4,809,589 A | 3/1989 | Bertrand | 92/98 R |
| 5,177,579 A | 1/1993 | Jerman | 73/724 |
| 5,226,321 A | 7/1993 | Varnham et al. | 73/505 |
| 5,383,362 A | 1/1995 | Putty et al. | 73/505 |

(Continued)

FOREIGN PATENT DOCUMENTS

| | | | |
|---|---|---|---|
| EP | 0860685 | 8/1998 | G01C 19/56 |
| EP | 1788385 | 5/2007 | G01N 29/02 |

(Continued)

OTHER PUBLICATIONS

Ayazi, "Intergrated Solutions for Motion Sensing in Handheld Devices," Qualtré Inc., http://www.qualtre.com/motion-sensing-technology/ , Oct. 2010, 3 pages.

(Continued)

*Primary Examiner* — Paul West
*Assistant Examiner* — Xin Zhong
(74) *Attorney, Agent, or Firm* — Wolf, Greenfield & Sacks, P.C.

(57) ABSTRACT

A method of detecting motion provides a resonator having a mass, moves the mass in a translational mode, and actuates the mass in a given bulk mode. The mass moves in the translational and given bulk modes at substantially the same time and, accordingly, the resonator is configured to detect linear and rotational movement when moving and actuating the mass in the translational and given bulk modes. The method produces one or more movement signals representing the detected linear and rotational movement.

20 Claims, 16 Drawing Sheets

(56) References Cited

U.S. PATENT DOCUMENTS

| | | | |
|---|---|---|---|
| 5,450,751 A | 9/1995 | Putty et al. | 73/504.18 |
| 5,589,082 A | 12/1996 | Lin et al. | 216/2 |
| 5,616,864 A | 4/1997 | Johnson et al. | 73/504.04 |
| 5,652,374 A | 7/1997 | Chia et al. | 73/1.38 |
| 5,750,899 A | 5/1998 | Hegner et al. | 73/756 |
| 5,767,405 A | 6/1998 | Bernstein et al. | 73/504.16 |
| 5,783,749 A | 7/1998 | Lee et al. | 73/504.12 |
| 5,915,276 A | 6/1999 | Fell | 73/504.13 |
| 5,937,275 A | 8/1999 | Munzel et al. | 438/50 |
| 5,992,233 A | 11/1999 | Clark | 73/514.35 |
| 6,105,427 A | 8/2000 | Stewart et al. | 73/514.32 |
| 6,128,954 A | 10/2000 | Jiang | 73/504.13 |
| 6,151,964 A | 11/2000 | Nakajima | 73/504.13 |
| 6,158,280 A | 12/2000 | Nonomura et al. | 73/504.04 |
| 6,209,393 B1 | 4/2001 | Tomikawa et al. | 73/504.12 |
| 6,240,781 B1 | 6/2001 | Namerikawa | 73/504.13 |
| 6,343,509 B1 | 2/2002 | Fell et al. | 73/504.13 |
| 6,401,534 B1 | 6/2002 | Fell et al. | 73/504.13 |
| 6,438,242 B1 | 8/2002 | Howarth | 381/190 |
| 6,635,509 B1 | 10/2003 | Ouellet | 438/106 |
| 6,848,305 B2 | 2/2005 | Fell et al. | 73/504.13 |
| 6,877,374 B2 | 4/2005 | Geen | 73/504.14 |
| 6,892,575 B2 | 5/2005 | Nasiri et al. | 73/504.12 |
| 6,958,566 B2 | 10/2005 | Nguyen et al. | 310/321 |
| 6,978,674 B2 | 12/2005 | Fell et al. | 73/504.13 |
| 6,985,051 B2 | 1/2006 | Nguyen et al. | 333/186 |
| 7,032,451 B2 | 4/2006 | Geen | 73/504.14 |
| 7,043,985 B2 | 5/2006 | Ayazi et al. | 73/504.04 |
| 7,051,590 B1 | 5/2006 | Lemkin et al. | 73/504.04 |
| 7,089,792 B2 | 8/2006 | Geen | 73/504.14 |
| 7,123,111 B2 | 10/2006 | Brunson et al. | 331/116 M |
| 7,178,378 B2 | 2/2007 | Crawley et al. | 73/24.06 |
| 7,204,144 B2 | 4/2007 | Geen | 73/504.14 |
| 7,216,539 B2 | 5/2007 | Geen | 73/504.14 |
| 7,216,541 B2 | 5/2007 | Kato et al. | 73/514.32 |
| 7,357,025 B2 | 4/2008 | Geen | 73/504.12 |
| 7,420,318 B1 | 9/2008 | Pulskamp | 310/328 |
| 7,427,819 B2 | 9/2008 | Hoen et al. | 310/320 |
| 7,444,870 B2 | 11/2008 | Uchlyama et al. | 73/504.12 |
| 7,492,241 B2 | 2/2009 | Piazza et al. | 333/189 |
| 7,543,496 B2 | 6/2009 | Ayazi et al. | 73/504.13 |
| 7,551,043 B2 | 6/2009 | Nguyen et al. | 333/186 |
| 7,578,186 B2 | 8/2009 | Matsuhisa | 73/504.12 |
| 7,581,443 B2 | 9/2009 | Kubena et al. | 73/504.12 |
| 7,617,727 B2 | 11/2009 | Watson | 73/504.13 |
| 7,637,156 B2 | 12/2009 | Araki et al. | 73/504.13 |
| 7,874,209 B2 | 1/2011 | Stewart | 73/504.01 |
| 7,878,060 B2 | 2/2011 | Yoshikawa | 73/504.04 |
| 7,895,892 B2 | 3/2011 | Aigner | 73/504.01 |
| 8,056,413 B2 | 11/2011 | Yazdi | 73/504.13 |
| 8,146,425 B2 | 4/2012 | Zhang et al. | 73/514.32 |
| 8,166,816 B2 | 5/2012 | Ayazi et al. | 73/504.12 |
| 8,250,919 B2 | 8/2012 | Ofri et al. | 73/504.13 |
| 8,372,677 B2 | 2/2013 | Mehregany | 438/51 |
| 8,408,060 B2 | 4/2013 | Kuang et al. | 73/504.13 |
| 8,616,056 B2 | 12/2013 | Sammoura et al. | 73/504.13 |
| 8,631,700 B2 | 1/2014 | Sammoura et al. | 73/504.12 |
| 9,091,544 B2 | 7/2015 | Johari-Galle | 73/504.13 |
| 2002/0029637 A1 | 3/2002 | Matsumoto et al. | 73/504.01 |
| 2003/0051550 A1 | 3/2003 | Nguyen et al. | 73/514.36 |
| 2003/0119220 A1 | 6/2003 | Mlcak et al. | 438/52 |
| 2003/0183888 A1 | 10/2003 | Bar-Sadeh et al. | 257/419 |
| 2004/0050160 A1 | 3/2004 | Bae et al. | 73/504.13 |
| 2004/0051595 A1 | 3/2004 | Yoshimine et al. | 331/158 |
| 2004/0085000 A1 | 5/2004 | Ogiura | 310/329 |
| 2004/0134279 A1 | 7/2004 | Fell et al. | 73/504.13 |
| 2005/0072230 A1 | 4/2005 | Koike et al. | 73/504.12 |
| 2005/0148065 A1 | 7/2005 | Zhang et al. | 435/287.2 |
| 2006/0133953 A1 | 6/2006 | Zhang et al. | 422/58 |
| 2006/0196253 A1 | 9/2006 | Crawley et al. | 73/53.01 |
| 2006/0197411 A1 | 9/2006 | Hoen et al. | 310/320 |
| 2006/0237806 A1 | 10/2006 | Martin et al. | 257/415 |
| 2006/0238078 A1 | 10/2006 | Liu | 310/338 |
| 2007/0046398 A1 | 3/2007 | Nguyen et al. | 333/186 |
| 2007/0172940 A9 | 7/2007 | Manalis et al. | 435/287.2 |
| 2007/0220971 A1 | 9/2007 | Ayazi et al. | 73/504.02 |
| 2007/0256495 A1 | 11/2007 | Watson | 73/504.12 |
| 2007/0284971 A1 | 12/2007 | Sano et al. | 310/364 |
| 2008/0054759 A1 | 3/2008 | Ayazi et al. | 310/309 |
| 2008/0168838 A1 | 7/2008 | Martin et al. | 73/514.32 |
| 2008/0180890 A1 | 7/2008 | Bolis | 361/679 |
| 2008/0190181 A1 | 8/2008 | Khuri-Yakub et al. | 73/64.53 |
| 2008/0282833 A1 | 11/2008 | Chaumet | 74/5 R |
| 2009/0064782 A1 | 3/2009 | Yazdi | 73/504.13 |
| 2009/0095079 A1* | 4/2009 | Ayazi | G01P 15/0975 73/514.29 |
| 2009/0114016 A1 | 5/2009 | Nasiri et al. | 73/504.12 |
| 2009/0133498 A1 | 5/2009 | Lo et al. | 73/504.13 |
| 2009/0173157 A1 | 7/2009 | Stewart | 73/504.13 |
| 2009/0173158 A1 | 7/2009 | Gehring | 73/590 |
| 2009/0188317 A1 | 7/2009 | Aigner | 73/504.01 |
| 2009/0241662 A1 | 10/2009 | Supino et al. | 73/504.12 |
| 2009/0266162 A1 | 10/2009 | Ayazi et al. | 73/504.12 |
| 2009/0277271 A1 | 11/2009 | Seppa et al. | 73/627 |
| 2010/0058861 A1 | 3/2010 | Kuang et al. | 73/504.12 |
| 2010/0107761 A1 | 5/2010 | Ofri et al. | 73/504.13 |
| 2010/0148341 A1 | 6/2010 | Fuji et al. | 257/686 |
| 2010/0218606 A1 | 9/2010 | Fell | 73/504.13 |
| 2010/0263445 A1 | 10/2010 | Hayner et al. | 73/504.12 |
| 2010/0294039 A1 | 11/2010 | Geen | 73/504.12 |
| 2011/0023601 A1 | 2/2011 | Ikeda et al. | 73/504.13 |
| 2011/0048131 A1 | 3/2011 | Reinmuth | 73/504.12 |
| 2011/0192226 A1 | 8/2011 | Hayner et al. | 73/504.12 |
| 2011/0254599 A1 | 10/2011 | Dikshit et al. | 327/156 |
| 2012/0013774 A1 | 1/2012 | Kim et al. | 348/246 |
| 2012/0111112 A1 | 5/2012 | Sammoura et al. | 73/514.01 |
| 2012/0111113 A1 | 5/2012 | Sammoura et al. | 73/514.01 |
| 2012/0112765 A1 | 5/2012 | Sparks et al. | 324/633 |
| 2012/0137773 A1* | 6/2012 | Judy | G01C 19/5684 73/504.12 |
| 2012/0137774 A1 | 6/2012 | Judy et al. | 73/504.12 |
| 2012/0195797 A1 | 8/2012 | Sparks et al. | 422/69 |
| 2012/0227487 A1 | 9/2012 | Ayazi et al. | 73/504.08 |
| 2013/0199294 A1 | 8/2013 | Townsend et al. | 73/504.13 |
| 2013/0319116 A1 | 12/2013 | Johari-Galle | 73/504.13 |
| 2016/0123735 A1 | 5/2016 | Gregory et al. | G01C 19/5677 |
| 2016/0153779 A1 | 6/2016 | Vohra et al. | G01C 19/5698 |

FOREIGN PATENT DOCUMENTS

| | | | |
|---|---|---|---|
| EP | 2 078 925 | 7/2009 | G01C 19/56 |
| EP | 2216904 | 8/2010 | H03H 9/25 |
| JP | 9116250 | 5/1997 | H05K 1/18 |
| JP | 2004 301734 | 10/2004 | G01C 19/56 |
| JP | 2008-64742 | 3/2008 | G01P 21/00 |
| JP | 2009-531707 | 9/2009 | G01C 19/56 |
| WO | WO 2007/061610 | 5/2007 | H01L 41/08 |
| WO | WO 2009/066640 | 5/2009 | H03H 9/25 |

OTHER PUBLICATIONS

Ayazi et al., "High Aspect-Ratio Combined Poly and Single-Crystal Silicon (HARPSS) MEMS Technology;" Journal of Microelectromechanical Systems, vol. 9, No. 3, Sep. 2000, 7 pages.

Ayazi et al., "Design and Fabrication of a High-Performance Polysilicon Vibrating Ring Gyroscope;" Center for Integrated Sensors and Circuits; Eleventh IEEE/ASME International Workshop on Micro Electro Mechanical Systems, Heidelberg, Germany, Jan. 25-29, 1998, 6 pages.

Ayazi et al., "A HARPSS Polysilicon Vibrating Ring Gyroscope;" Journal of Microelectromechanical Systems, vol. 10, No. 2, Jun. 2001, 11 pages.

Benes et al., "Comparison Between BAW and SAW Sensor Principles," *IEEE Transactions on Ultrasonics, Ferroelectrics and Frequency Control*, vol. 45 No. 5, Sep. 1998, pp. 1314-1330.

Bernstein, "An Overview of MEMS Inertial Sensing Technology," *Sensors*, http://www.sensorsmag.com/sensors/acceleration-vibration/an-overview-mems-inertial-sensing-technology-970 , Feb. 1, 2003, 6 pages.

Celikel et al., "Optoelectronic Design Parameters of Interferometric Fiber Optic Gyroscope with LiNbO3 Having North Finder Capa-

(56) References Cited

OTHER PUBLICATIONS bility and Earth Rotation Rate Measurement," *Indian Journal of Pure & Applied Physics*, vol. 48, pp. 375-384, Jun. 2010, 10 pages.
Doe, "Qualtré Targets 3-Axis Gyro Market with Alternative Technology," *MEMS Trends*, Issue No. 3, pp. 8, Jul. 2010, 1 page.
Drafts, "Acoustic Wave Technology Sensors," Sensors (www.sensorsmag.com), 5 pages, Oct. 1, 2000.
Dubois, "Thin film bulk acoustic wave resonators: a technology overview," MEMSWAVE 03, Toulouse, France, 4 pages, Jul. 2-4, 2003.
Geen et al., New iMEMS® Angular-Rate-Sensing Gyroscope; ADI Micromachined Products Division; Analog Dialogue 37-3 (2003), 4 pages.
Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, Dec. 2008, 28 pages.
Johari et al., "High-Frequency Capacitive Disk Gyroscope in (100) and (111) Silicon," School of Electrical and Computer Engineering, Georgia Institute of Technology, MEMS 2007, pp. 47-50, Jan. 2007, 4 pages.
Johari et al., "Capacitive Bulk Wave Silicon Disk Gyroscopes," Electron Devices Meeting, 2006, Dec. 1, 2006, 4 pages.
Johnson, "Mechanical filters in electronics", John Wiley and Sons, 1983. ISBN: 0-471-08919-2 Chapter 3: Resonators and Coupling Elements, p. 83-97.
Johnson, "Qualtre Preps Solid State MEMS Gyros," *MEMS Investor Journal*, http://www.memsinvestorjournal.com/2010/04/qualtre-preps-solidstate-mems-gyros.html , Apr. 8, 2010, 2 pages.
Link, "Angular Rate Detector DAVED®-RR," Application Report SE 090.2; Institute of Micromachining and Information Technology, 1 page, Dec. 11, 2007, http://hsgimit.de/fileadmin/gfx/pdfs/AnwendungsberichtSE090_2rr_englisch_Vl.pdf.
Link, "Angular Rate Detector DAVED®-LL," Application Report SE 100.1; Institute of Micromachining and Information Technology, 1 page, Dec. 11, 2007,hsg-imit.de/fileadmin/gfx/pdfs/anwendungsberichtse100_1ll_englisch01.pdf.
Nasiri, "A Critical Review of MEMS Gyroscopes Technology and Commercialization Status," InvenSense, 8 pages, 2005, www.scantec.de/uploads/mdia/MEMSGyroComp_02.pdf.
Ramirez, "PZE Energy Harvester," *45 RF MEMS Based Circuit Design*—conocimeintos.com.ve, http://conocimientosrfmemsdesign.blogspot.com/2010/07/pze-energy-harvester.html , Jul. 24, 2010, 4 pages.
Satrom et al., "Disc Resonating Gyroscopes: A Summary of a Recent Development in MEMS Technology," Northwestern University, http://www.google.com/url?sa=t&rct=j&q=&esrc=sfrm=1&source=web&cd=1&sqi=2&ved=0CCQQFjAA&url=http%3A%2F%2Fclifton.mech.north western.edu%2F~me381%2Fproject%2F06fall%2FFruthSatrom.pdf&ei=ZOsyT6D3IMjMrQfE6qSnDA&usg=AFQjCNFXOj00sAsF6bMdfEV70D7JzzLkBw&sig2=jwpU1Tgot45sT_fgi81zMw, Dec. 1, 2006, 15 pages.
Saukoski, "System and Circuit Design for a Capacitive MEMS Gyroscope," Doctoral Dissertation, TKK Dissertations 116, Helsinki University of Technology, 279 pages (2008).
Yang et al., "An electro-thermal bimorph-based microactuator for precise track-positioning of optical disk drives;" J. Micromech. Microeng., v. 15 (2005) 958-965 Journal of Micromechanics and Microengineering.
Jonathan, Grant Third Party Submission under 37 C.F.R. § 1.290 for U.S. Appl. No. 12/983,476, 8 pages, dated Nov. 6, 2012.
Jonathan, Grant Third Party Submission under 37 C.F.R. § 1.290 for U.S. Appl. No. 13/308,687, 8 pages, dated Nov. 6, 2012.
International Searching Authority, Invitation to Pay Additional Fees and, Where Applicable, Protest Fee—International Application No. PCT/US2011/062966, 6 pages, dated Feb. 3, 2012.
International Searching Authority, Invitation to Pay Additional Fees and, Where Applicable, Protest Fee—International Application No. PCT/US2011/062961, 8 pages, dated May 8, 2012.
Park et al., "Oscillation Control Algorithms for Resonant Sensors with Applications to Vibratory Gyroscopes," *Sensors*, vol. 9, pp. 5952-5967, (2009).
Senkal et al., "100K Q-Factor Toroidal Ring Gyroscope Implemented in Wafer-Level Epitaxial Silicon Encapsulation Process," *2014 IEEE 27th International Conference on Micro Electro Mechanical Systems (MEMS)*, pp. 24-27 (2014).
Sonmezoglu et al., "Simultaneous Detection of Linear and Coriolis Accelerations on a Mode-Matched MEMS Gyroscope," *2014 IEEE 27th International Conference on Micro Electro Mechanical Systems (MEMS)*, pp. 32-35 (2014).
United States Patent and Trademark Office, Non-Final Office Action—U.S. Appl. No. 14/531,123, dated Jul. 7, 2016, 13 pages.

\* cited by examiner

METHOD AND APPARATUS FOR DETECTING LINEAR AND ROTATIONAL MOVEMENT

FIELD OF THE INVENTION

Various embodiments of the invention generally relate to inertial sensors and, more particularly, various embodiments of the invention relate to bulk sensors that detect both linear and rotational movement.

BACKGROUND OF THE INVENTION

Bulk acoustic wave ("BAW") resonator use has increased in recent years as an inertial sensor. This trend is driven by their many benefits including, among other things, their high gain factor, which provides improved signal fidelity in a given size so that they typically cost less to manufacture.

To those ends, many bulk acoustic wave gyroscopes known to the inventors have a disk with a crystal lattice that, during either or both an actuation or detection phase, vibrates/resonates at a very high frequency, typically in the megahertz range. This is in contrast to gyroscopes having a disk mechanically moving back and forth about a substrate in both phases. When the crystal lattice of the disk vibrates, the disk is considered to be operating in a "bulk" mode.

SUMMARY OF THE INVENTION

In accordance with one embodiment of the invention, a method of detecting motion provides a resonator having a mass, moves the mass in a translational mode (e.g., either in a bulk translational mode or another translational mode), and actuates the mass in a given bulk mode. The mass moves in the translational mode and given bulk mode at substantially the same time and, accordingly, the resonator is configured to detect linear and rotational movement when moving and actuating the mass in the translational mode and given bulk mode. The method produces one or more movement signals representing the detected linear and rotational movement.

The resonator may be considered to have a top substrate and a bottom substrate, a top anchor coupling the top side of the mass with the top substrate, and a bottom anchor coupling the bottom side of the mass with the bottom substrate. Some embodiments move the mass in a translational mode by moving the mass in a generally cylindrical orbit within the resonator.

The translational mode moves the mass in accordance with a translational frequency, and the given bulk mode similarly moves the mass at a different frequency—the bulk frequency. The bulk frequency illustratively is higher than the translational frequency, although some embodiments may have a lower bulk frequency. To avoid distortion, the translational frequency and bulk frequency preferably are harmonically unrelated.

Whether or not it is moving in the given bulk mode, for translational modes, the mass may move in the x-translational mode only. Alternatively, the mass may move in both the x-translational mode and the y-translational mode. Among other ways, the mass may move at substantially the same frequency in both the x-translational mode and the y-translational mode, where the frequency of the x-translational mode is out of phase with the signal of the y-translational mode (e.g., about 90 degrees out of phase, plus or minus about 2 degrees).

In accordance with another embodiment, a resonator has a substrate supporting a mass, a plurality of actuation electrodes configured to actuate the mass, and a plurality of sense electrodes configured to detect mass movement. The resonator also has an input operably coupled with the plurality of actuation electrodes, and an output operably coupled with the plurality of sense electrodes. The input is configured to receive a translational signal and a bulk signal, which have different frequencies. The mass moves in a translational mode in response to receipt of the translational signal, and in a bulk mode in response to receipt of the bulk signal. The plurality of sense electrodes are configured to detect both linear and rotational motion of the mass when the input receives the translational signal and the bulk signal. Moreover, the output is configured to forward a movement signal representing the detected linear and rotational movement.

In accordance with another embodiment of the invention, a method of detecting motion moves a mass of a resonator in both a bulk mode and at least one translational mode at substantially the same time. The translational mode is produced by a translational signal having a translational frequency, while the given bulk mode is produced by a bulk signal having a bulk frequency. The translational frequency and bulk frequency are different and harmonically unrelated. The method also detects linear and rotational movement when moving and actuating the mass in the translational mode and bulk mode, and generates at least one signal having data relating to the detected linear and rotational movement.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2 is rotated 180 degrees from FIG. 3, which is oriented appropriately for use of the terms "top" and "bottom."

DESCRIPTION OF ILLUSTRATIVE EMBODIMENTS

In illustrative embodiments, a resonator can function an accelerometer, a gyroscope, or both an accelerometer and a gyroscope. To that end, the resonator may operate in a translational mode to detect linear movement (either a bulk mode or a non-bulk mode), in a bulk mode to detect rotational motion, or in both modes at the same time to detect both linear and rotational movement. Details of illustrative embodiments are discussed below.

Various embodiments can use a plurality of different modes to detect rotational movement. FIGS. 1A-1D graphically show several illustrative modes used by various embodiments of the resonator. It should be noted that these modes are exemplary and thus, other embodiments may use additional modes.

Figure 1A:
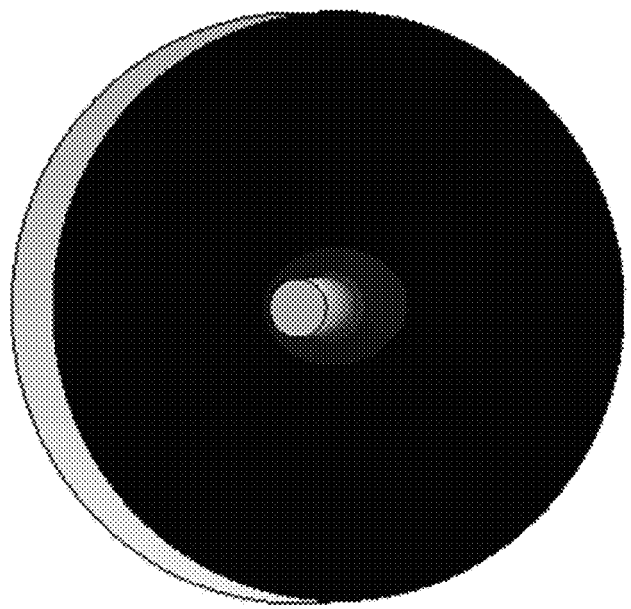
FIGS. 1A-1D graphically show four different modes for use in illustrative embodiments of the invention.
Figure 1A:
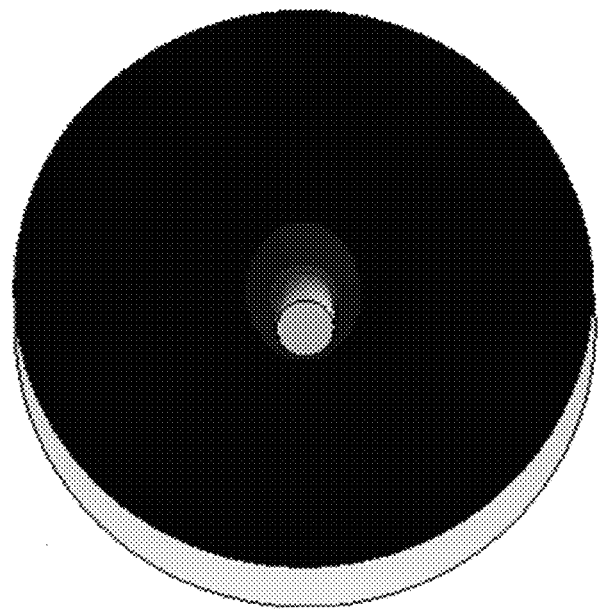
Figure 1B:
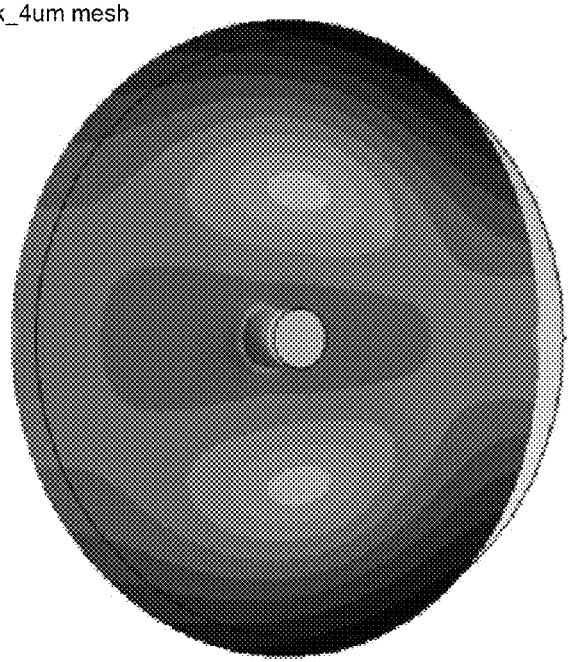
Figure 1B:
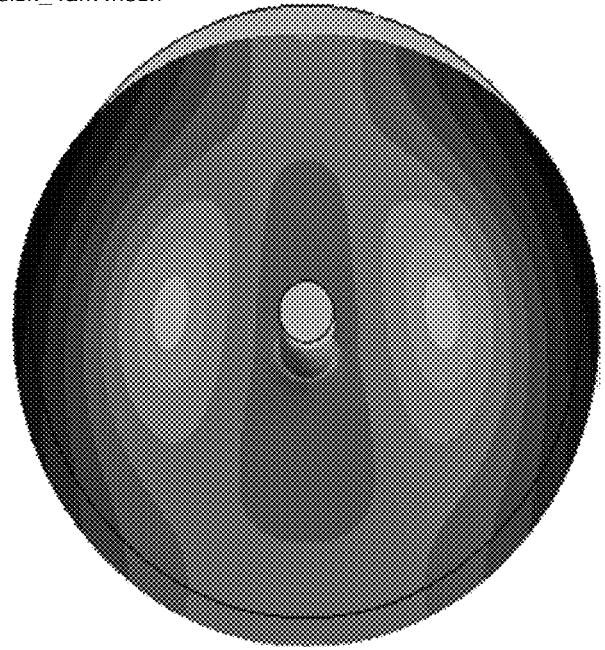

FIGS. 1A and 1B show a resonator disk and its securing anchor (both discussed in detail below) moving in two different translational modes—one is a bulk mode and the other is not a bulk mode. As discussed in greater detail below, both translational modes are useful for detecting acceleration.

Specifically, FIG. 1A shows movement/displacement characteristics of the disk and anchor in the Discrete Translational mode, which is not a bulk mode. When in this mode, as known by those in the art, the disk remains undeformed and oscillates in-plane along one or both of the axes. The black circle outline shows the disk when at rest, while the solid portion shows the disk in movement. Since it is moving along the X-axis, the top figure is referred to as being in a type of "X-translational mode," while the bottom figure is referred to as being in a type of "Y-translational mode." Indeed, when in this discrete mode, the X-translational and Y-translational modes are considered to be in the Discrete Translational mode. Accordingly, in this mode, the anchor bends to accommodate disk movement. The stiffness of this system therefore is defined by the anchor.

The scale on the side of these drawings shows the amount of movement demonstrated in simulations. This scale moves from white, which represents a minimum movement, to black, which represents a maximum movement. As shown, in this mode, the disk moves the most and it moves substantially uniformly (it is not deforming), while the anchor moves the least.

It should be noted that the information (in the top left corners of FIGS. 1A-1D) referencing disk size, frequency, date, and other information simply relate to parameters used to generate the simulated images with finite element analysis. Accordingly, that information should not limit various embodiments.

FIG. 1B shows movement/displacement characteristics of that disk and anchor in a different translational mode—the Second Asymmetric mode. This mode is a bulk mode and thus, the disk is deformed and translating/moving in-plane. Like in FIG. 1A, the scale on the side helps identify different nodes and movement characteristics of the disk and anchor. In the top drawing, the disk is considered to be an "X-translational mode" (as noted, a bulk mode in this case) since it also translates along the X-axis. In a corresponding manner, in the bottom drawing, the disk is considered to be in a "Y-translational mode" (also as noted, a bulk mode in this case) because it also translates along the Y-axis.

Figure 1C:
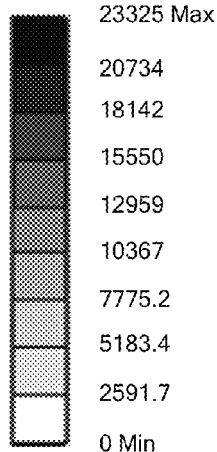
Figure 1C:
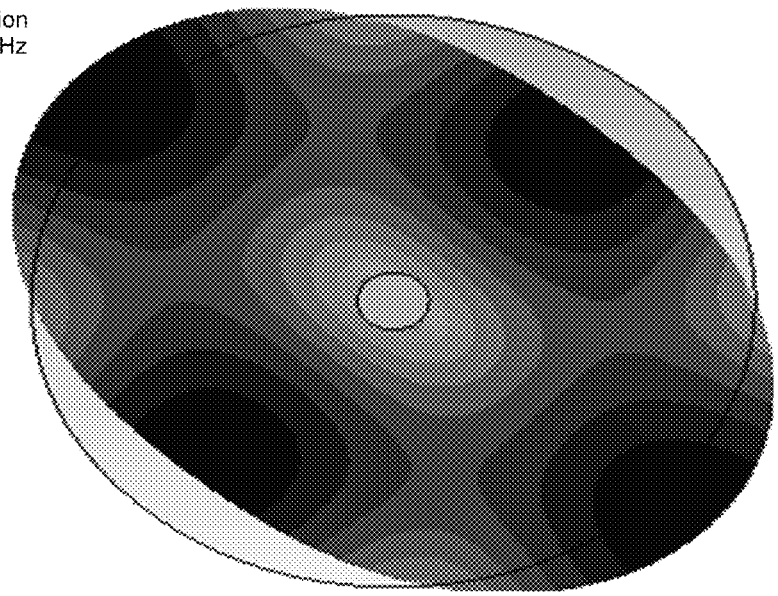
Figure 1C:
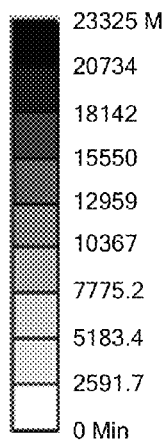
Figure 1C:
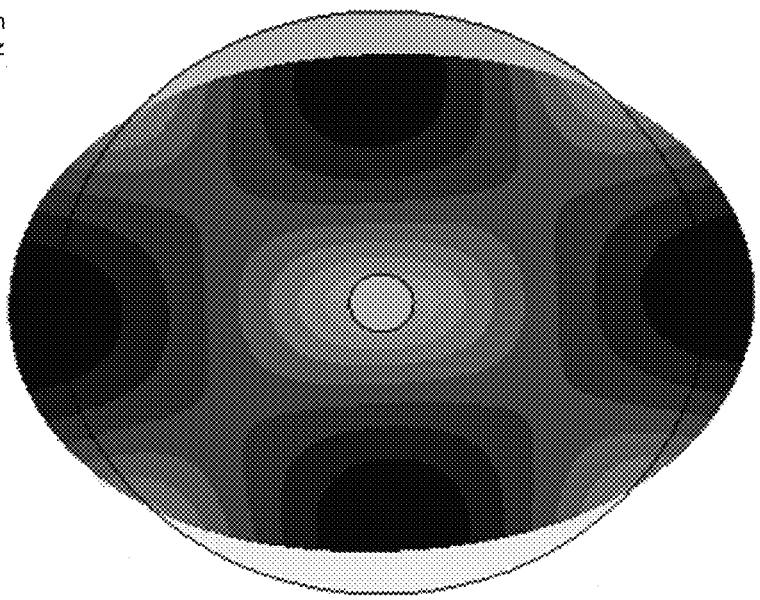
Figure 1D:
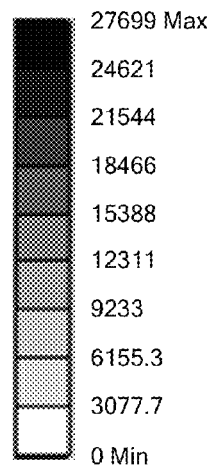
Figure 1D:
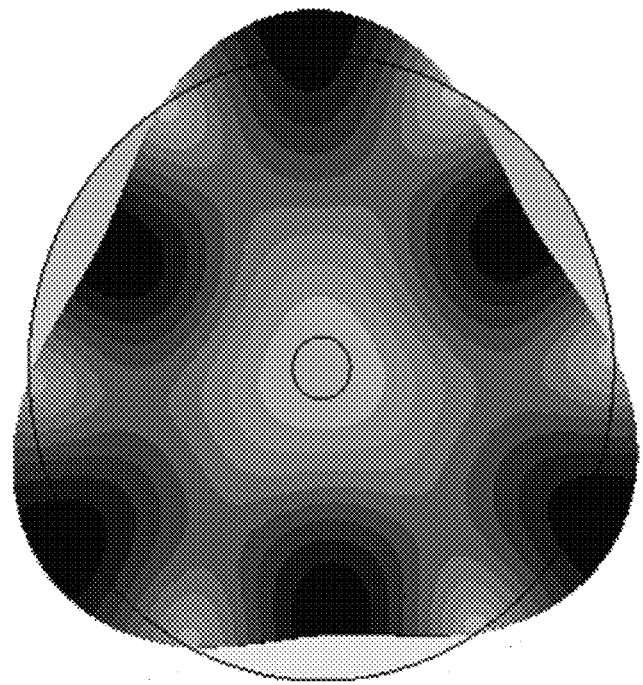
Figure 1D:
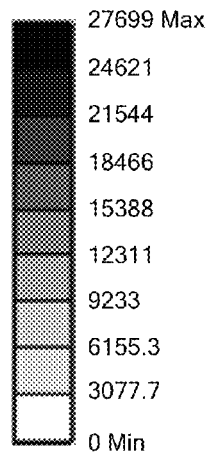
Figure 1D:
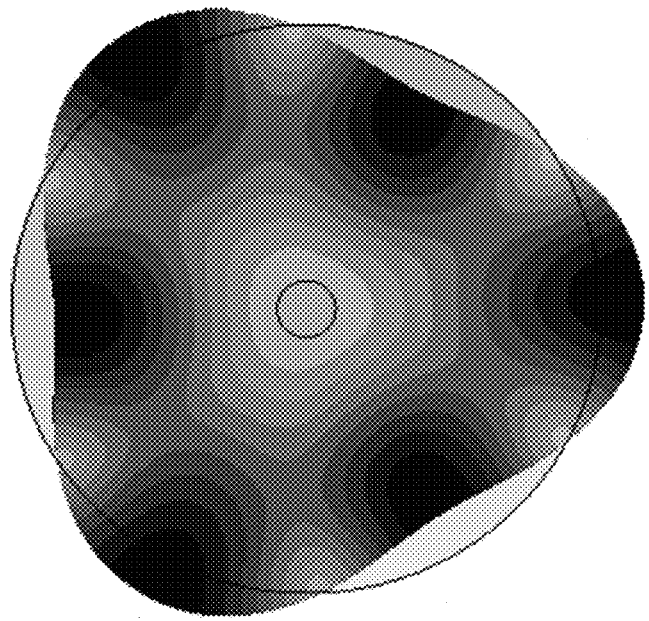

FIGS. 1C and 1D show movement/displacement characteristics of the disk and anchor when subjected to two different types of bulk modes. Both of these bulk modes are useful for determining rotational movement. To that end, FIG. 1C shows the disk and anchor actuated in the Lowest Frequency Contour mode. As known by those in the art, the disk and anchor are deformed/actuated in a "resonator" sub-mode (bottom drawing) to detect rotation, and change to a Coriolis sub-mode (also an in-plane mode) when it detects rotation (top drawing). As known by those in the art, upon a rotation, the disk and anchor move/deform into a combination of both sub-modes/modes. As another example, FIG. 1D shows the disk and anchor actuated in the Third Order Elliptic mode. In a manner similar to the mode of FIG. 1C, the disk and anchor deform in-plane into a resonator sub-mode for actuation, and a Coriolis sub-mode upon a rotation. Accordingly, for the modes in FIGS. 1B, 1C, and 1D, the stiffness of this system is defined largely by the disk.

As noted above, these modes are illustrative. Other modes may be used. For example, an out-of plane flexure bulk mode also may be used and is discussed below by example. For additional information about various modes, see Robert A. Johnson, "Mechanical Filters In Electronics," John Wiley and Sons, 1983. ISBN: 0-471-08919-2.

Figure 2:
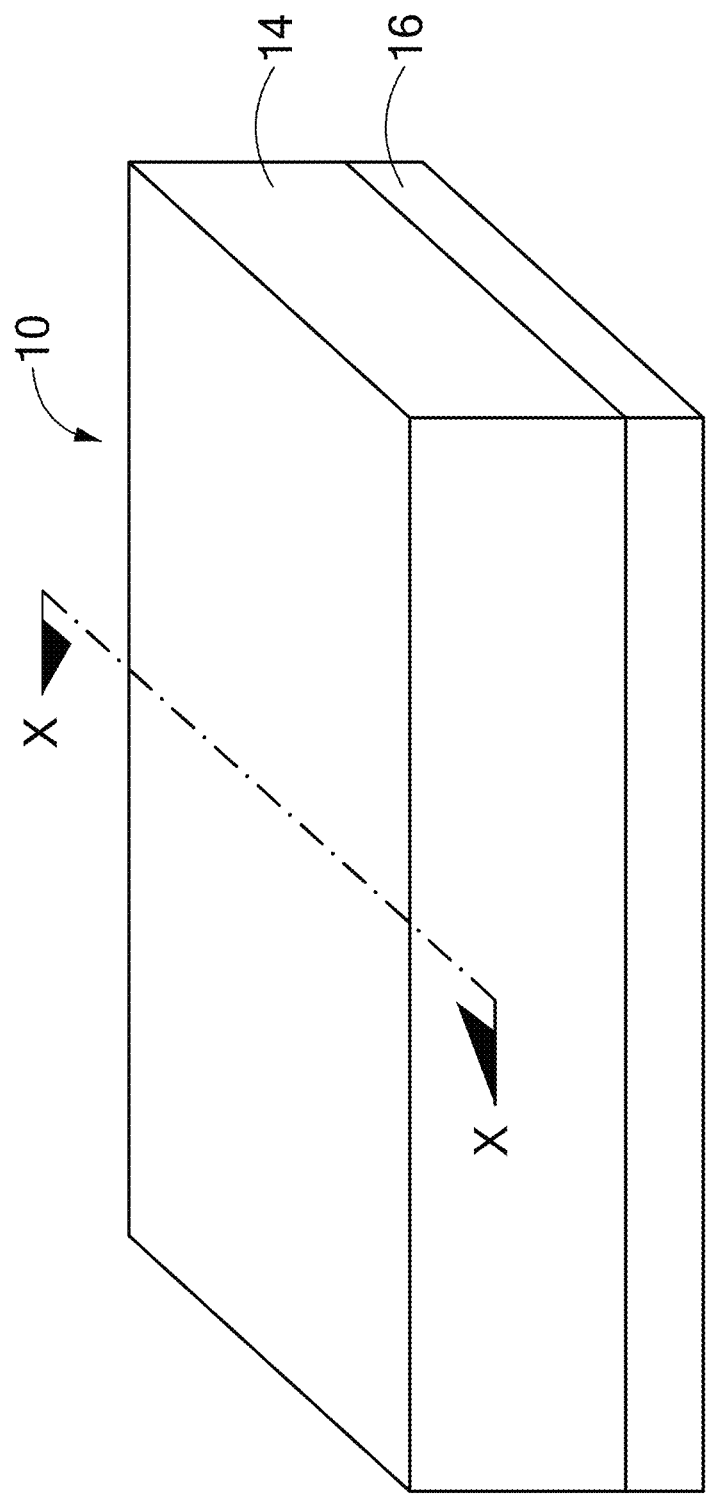
FIG. 2 schematically shows a perspective view of a packaged inertial sensor having a bulk acoustic wave resonator configured in accordance with illustrative embodiments of the invention.

FIG. 2 schematically shows a perspective view of a packaged inertial sensor 10 having a bulk acoustic wave resonator 12 (FIG. 3A and others, discussed below) configured in accordance with illustrative embodiments of the invention. Like other microchip packaging, this package protects its interior resonator 12 from the environment. As shown, the package has a top portion 14 that connects with a bottom portion 16 to form an interior (not shown) for containing the resonator 12. Although not necessary, some embodiments of the invention hermetically seal the package interior. Other embodiments of the package, however, do not provide a hermetic seal.

The package can be any of a variety of different types, such as, among other things, a pre-molded leadframe package, a substrate package, or a ceramic package. The top portion 14 and/or the bottom portion 16 can be planar or form a cavity. In either case, the top and bottom portions 14 and 16 should appropriately couple to protect the fragile microstructure of the resonator 12. For example, if the top portion 14 is flat, then the bottom portion 16 should have a cavity, or there should be some spacing apparatus to form the interior with an appropriate volume for containing the resonator 12.

In alternative embodiments, the package is a conventional post-molded, plastic leadframe package. Specifically, as known by those skilled in the art, this relatively inexpensive package type molds plastic, in liquid form, directly around the resonator die 12. This packaging process therefore can damage the resonator 12 if it is not properly sealed. In that case, the sensitive microstructure within the resonator 12 preferably is hermetically sealed or otherwise protected from the molding process, such as by means of capping technology.

The packaged resonator 10 may be used in any number of different applications. For example, it could be part of a larger guidance system in an aircraft, or part of a satellite sensor in an automobile that cooperates with a stabilization system to maintain a smooth ride and/or control air bag deployment. The packaged resonator 10 thus has a plurality of interfaces (not shown) for communicating with exterior components.

To those ends, the packaged resonator 10 may have a plurality of pins (not shown) on its bottom, top, and/or side surfaces for making a mechanical and electrical connection with an underlying system, such as a printed circuit board. Alternatively, the package may have a plurality of pads (not shown) for surface mounting the package to an underlying printed circuit board. Conventional soldering techniques should suffice to make this connection. The printed circuit board may have additional components that interact with the device to both control the resonator die 12, and receive output signals indicating movement (rotational, linear, or both) of the overall system. For example, the printed circuit board also may have one or more application-specific integrated circuits (ASICs) and other circuit devices for controlling operation.

Figure 3A:
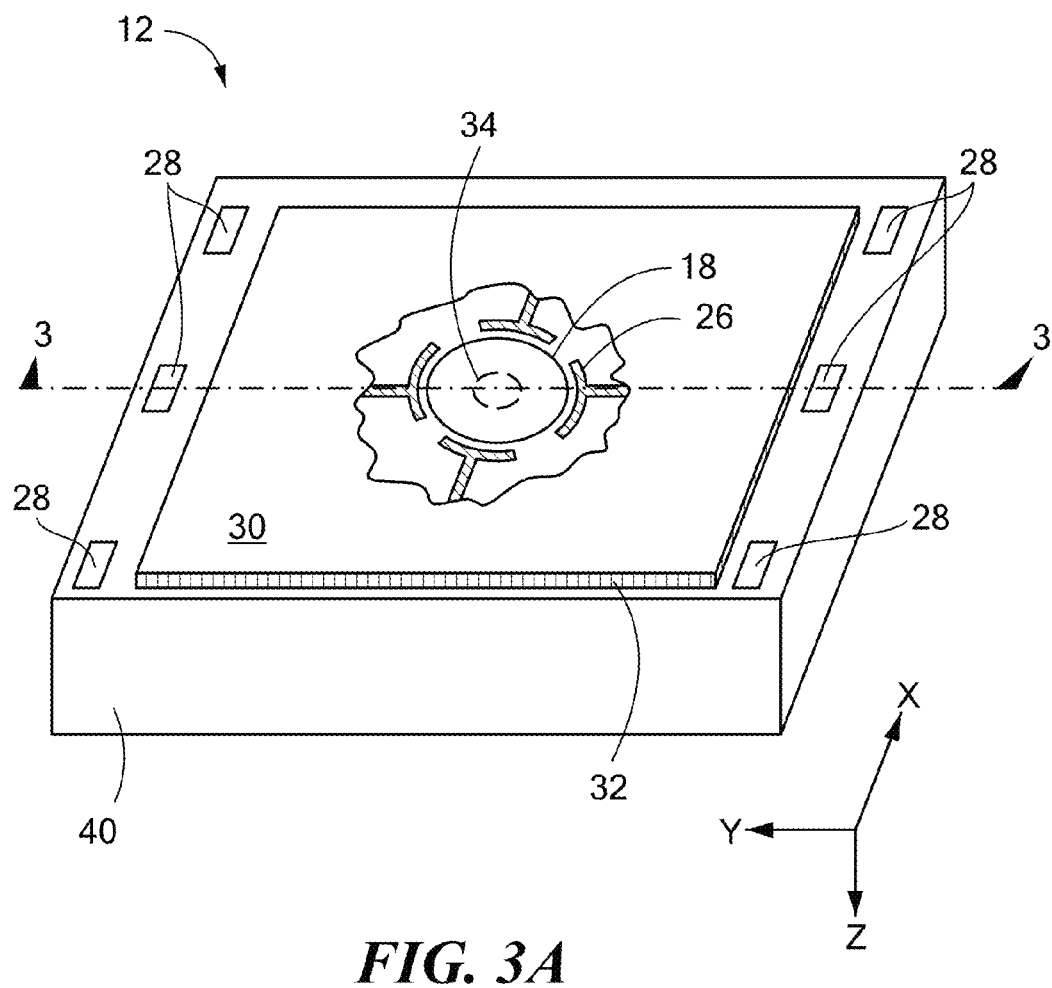
FIG. 3A schematically shows a perspective view of a bulk acoustic wave resonator configured in accordance with illustrative embodiments of the invention. This figure has a partial cutaway view to show the vibrating disk.
Figure 3B:
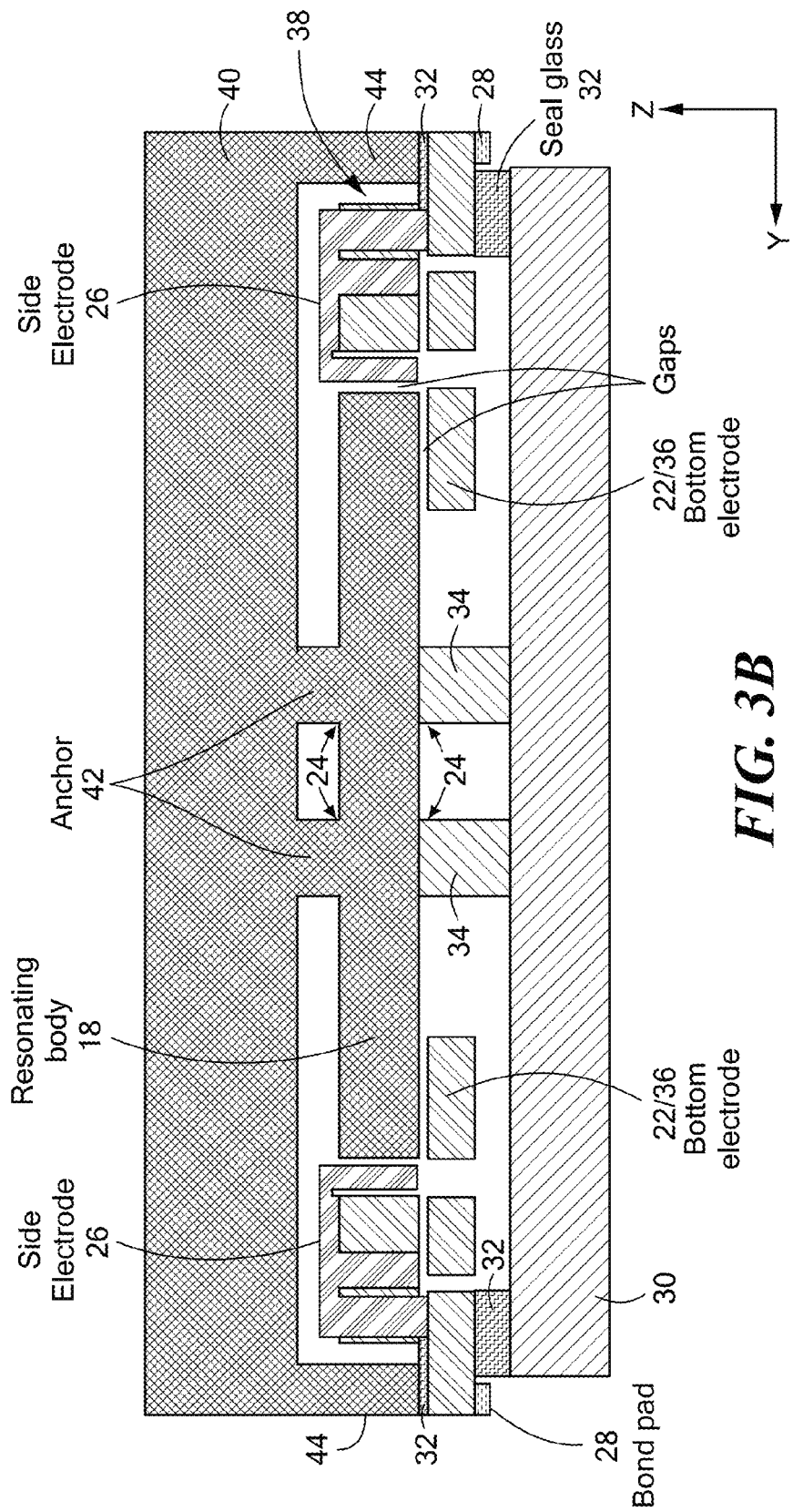
FIG. 3B schematically shows a cross-sectional view of the bulk acoustic wave resonator of FIG. 2 along line 3-3.

FIG. 3A schematically shows a perspective view of a microelectromechanical system ("MEMS") bulk acoustic wave resonator die 12 configured in accordance with illustrative embodiments of the invention. This figure also has a partial cutaway view to show its vibrating mass/disk 18 (with a portion of one substrate removed), and an outline of a member stabilizing a portion of that disk 18 (shown in dashed lines). To further illustrate this embodiment, FIG. 3B schematically shows a rotated, cross-sectional view of the bulk acoustic wave gyroscope of FIG. 3A along line 3-3.

Specifically, this description uses the terms "top," "bottom," and the like for descriptive purposes only. Those terms are used with respect to the frame of reference of FIG. 3B. FIG. 3A, however, is rotated 180 degrees (i.e., the top is down and the bottom is up) from FIG. 3B to better show certain components. Accordingly, elements identified as "top" elements in FIG. 3B, the correct orientation, are on the bottom side of FIG. 3A. For example, FIG. 3A shows a top substrate 40 (discussed below) near the bottom of the structure 12, while FIG. 3B shows that same top substrate 40 near the top of the same structure 12.

This resonator 12 is a one, two, or three dimensional inertial sensor that measures rotational movement about the X and Y axes shown in FIG. 3A, linear motion about any of the three orthogonal axes, or both. Accordingly, those skilled in the art refer to this type of resonator as either of all of an X/Y gyroscope, a two dimensional gyroscope, a one, two, or three axis accelerometer, and/or a combination accelerometer and gyroscope. It nevertheless should be reiterated that illustrative embodiments apply to inertial sensors that measure rotation about its other axes, such as the Z-axis alone, about the X-axis and Z-axis, or about all three axes, among other things. Accordingly, discussion of this specific two-dimensional resonator 12 should not limit various embodiments of the invention.

As noted above, the resonator 12 can act as a gyroscope and/or as an accelerometer. The gyroscopic function is discussed first, immediately below, with regard to FIGS. 2-5. Discussion of the accelerometer function follows with regard to FIGS. 6A-10.

At its core, the bulk acoustic wave ("BAW") resonator 12 has a generally planar disk 18 (noted above) that can resonate in one of the known types of bulk modes upon receipt of an appropriate electrostatic actuation signal. As noted above, the bulk mode for detecting rotational movement can be any of a variety of different bulk modes. While much of this discussion relates to the out-of-plane Flexure mode ("flexure mode," discussed as another example) to detect rotation, those in the art can apply its teachings to other modes, such as those discussed above with regard to FIGS. 1C and 1D. Accordingly, discussion of the flexure mode is not intended to limit various embodiments.

When using the flexure mode, a bottom electrode 22 (discussed below) produces an electrostatic force that causes portions of the disk 18 to vibrate in and out of the plane of the disk 18. As a bulk acoustic wave gyroscope, however, the crystal lattice of the disk 18 vibrates in response to both a rotation and the continued actuation by the noted electrostatic signal. This is in contrast to other types of gyroscopes that have a shuttle/mass vibrating back and forth above a substrate during both actuation and detection phases. To that end, the embodiment shown in FIGS. 3A and 3B has the above noted bottom electrode 22 for actuating/vibrating the disk 18 in a flexure mode at a preselected frequency. As known by those skilled in the art, this frequency can be quite high, such as on the order of about 1-3 Megahertz.

The disk 18 is configured to vibrate in a predetermined manner at the known vibration frequency. For example, the vibration frequency may be the resonant frequency of the disk 18. As such, the disk 18 vibrates in and out of plane in a non-uniform manner. Specifically, parts of the disk 18 may vibrate, while other parts of the disk 18 may remain substantially stable; i.e., the stable portions will vibrate at approximately zero Hertz. In other words, the stable portions substantially do not vibrate at all. The stable portions are known as "nodes 24" and preferably are located generally symmetrically about the top and bottom faces of the disk 18. For example, when vibrating at the resonant frequency, the bottom face of a 200 micron radius disk 18 may have a node 24 that forms a general ellipse about the center of the disk 18 (e.g., at the centroid of the disk 18). This elliptical node 24 may take on the shape of a circle with a radius of between about ten and fifteen microns.

Rotation about the X-axis or Y-axis causes the shape of the disk 18 to change into a bulk mode shape. To detect this change in shape, the resonator 12 has a plurality of side electrodes 26 generally circumscribing the disk 18. For example, the cutaway of FIG. 3A shows four side electrodes 26, some or all of which can detect this change. More specifically, those side electrodes 26 form a variable capacitor with the side wall of the disk 18. A change in the shape of the disk 18, in the bulk mode, causes at least a portion of its side disk wall to change its position, thus changing the distance between it and the side electrode 26. This changes the variable capacitance measured by the side electrode 26. It is this capacitance change that provides the necessary movement information. These side electrodes 26 thus may be referred to as "detection" or "sense" electrodes 26.

A plurality of pads 28 formed on the same layer as the bottom electrode 22 electrically connects the bottom and top electrodes 22 and 26 to other circuitry. Off-chip circuitry or on-chip circuitry (some not shown) thus detects the noted capacitance change as a changing signal, which includes the necessary information for identifying the degree and type of rotation. The larger system then can take appropriate action, such as controlling the rotation of tires in an automobile for stabilization control, or changing the trajectory of a guided missile.

Naturally, the disk 18 should be supported to function most effectively. To that end, the resonator 12 has a bottom substrate 30 mechanically bonded or integrally formed to the bottom of the disk 18. In illustrative embodiments, the bottom substrate 30 is formed from a single crystal silicon wafer and hermetically bonded to the layer having the bottom electrode 22 and pads 28. For example, a ring of seal glass 32, or glass frit, can hermetically seal this bottom substrate 30 to the disk/electrode structure.

The bottom substrate 30 shown in FIGS. 3A and 3B also has a bottom support portion 34 that mechanically connects to the bottom face of the disk 18. In illustrative embodiments, the bottom support portion 34 is connected directly to the node 24 on the bottom face of the disk 18. As noted above, this node 24 substantially does not vibrate when the disk 18 as actuated at its resonant frequency. The bottom support portion 34 can be formed from any number of materials. For example, this structure can be a solid piece of polysilicon, or a part of the layer forming the bottom electrode 22 and seal glass 32. Alternatively, the bottom support can be formed from the same material as the bottom substrate 30—e.g., one or more pedestals formed from a timed etch of the bottom substrate 30. In that case, the bottom support is integral with the bottom substrate 30, and formed Conventional micromachining processes may form the disk 18 and layer immediately beneath the disk 18 in any number of known ways. For example, that portion of the resonator 12 may be formed from a micromachined silicon-on-insulator wafer (also known as an "SOI" wafer). In that case, the disk 18 may be formed from the top, single crystal silicon layer of the SOI wafer. Moreover, the side electrodes 26 may be formed from deposited polysilicon and electrically connected with the bond pads 28, which may be formed from deposited metal.

As known by those skilled in the art, the top SOI layer is typically much thinner than the bottom layer 36 of the SOI wafer, which also is formed from single crystal silicon. The layer having the bottom electrode 22 (referred to as the "bottom layer 36"), however, is thinner than the layer having the disk 18 (referred to as the "top layer 38"). Although not necessary, illustrative embodiments thin this bottom layer 36 to reduce the profile of the overall sensor, and improve the performance of the bottom electrode 22. For example, the disk 18 may have a thickness of about 50 microns, while the bottom electrode 22 may have a thickness of about 40 microns.

In addition to stabilizing the disk 18 at the node region 24 on the bottom disk face, the inventors also stabilized at least a portion of the node region 24 of the top face of the disk 18. This stabilization should substantially eliminate undesired vibration in the area of the node 24 and facilitate its functioning as an accelerometer (discussed below). Accordingly, the top substrate 40 is secured to the top node region 24 of the disk 18. To that end, the top substrate 40 may be considered to have a top support portion 42 secured directly to the node region 24 of the top surface of the disk 18. In a manner similar to the bottom support portion 34, the top support portion 42 may be formed in any number of manners. For example, the top support portion(s) 42 may be formed as an anchor having a silicon-to-silicon bond with the disk 18. Moreover, the top support portion(s) 42, which, like the bottom support s(s) 34, may include a number of separate members, illustratively symmetrically positioned and spaced about the top surface of the disk 18.

Some embodiments do not stabilize the disk 18 at the node regions 24. For example, the disk 18 may be stabilized in its centroid or other region. Accordingly, discussion of stabilization at the node region 24 is for illustrative purposes and not intended to limit all embodiments of the invention.

The top substrate 40 also has an annular sealing region 44 that forms a seal with the bottom layer 36 of the disk/lower electrode apparatus. In a manner similar to the bottom substrate 30, the top substrate 40 may not provide a hermetic seal. When both substrates 30 and 40 provide a hermetic seal, however, those skilled in the art should expect the disk 18 to be fully protected by the chamber formed by both of the substrates 30 and 40.

Figure 4:
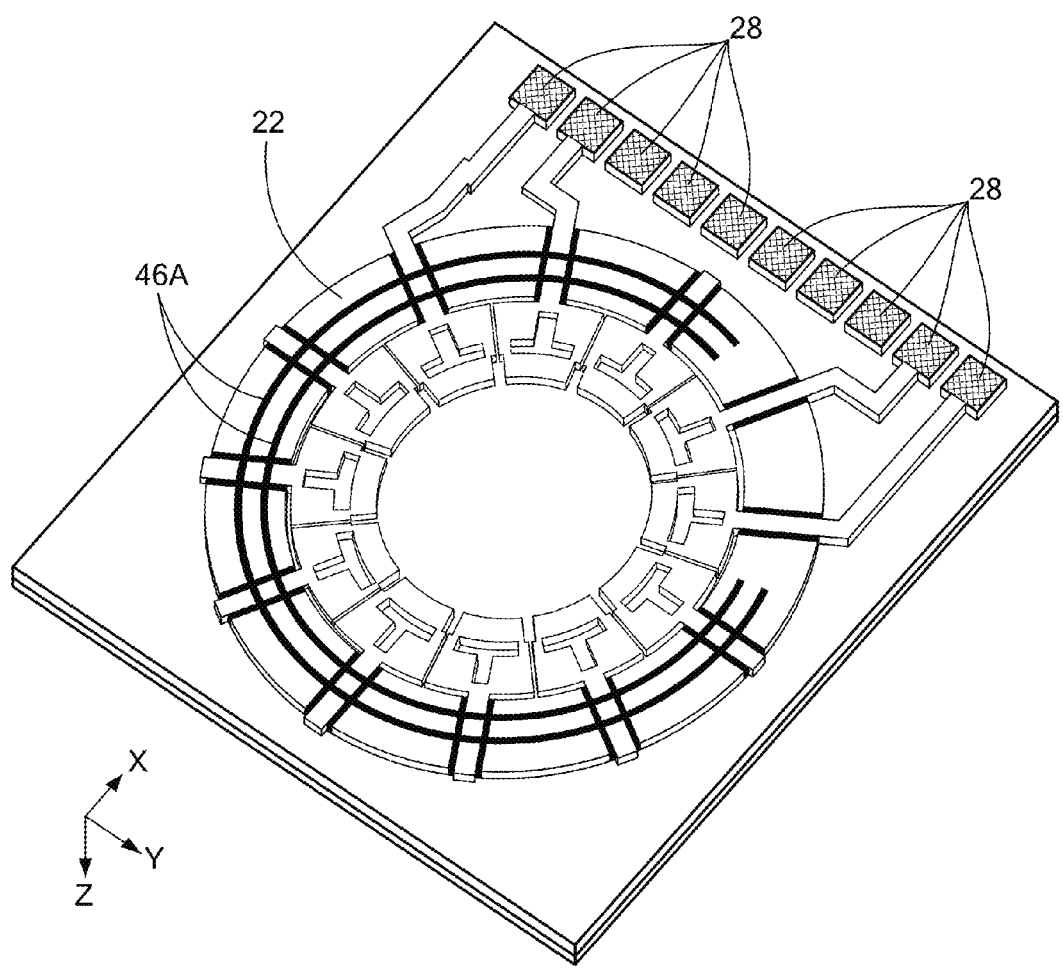
FIG. 4 schematically shows a top perspective view of a bottom electrode in the resonator of FIG. 2.
Figure 5:
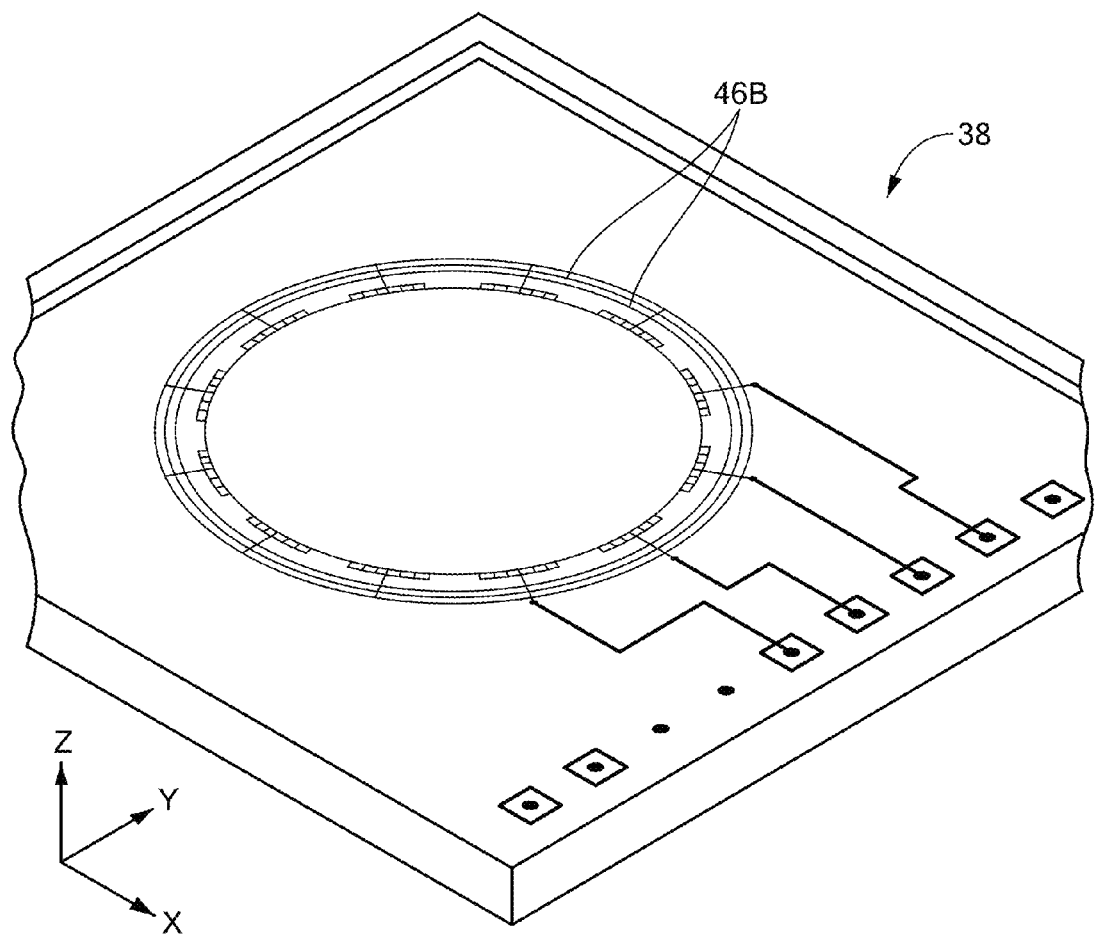
FIG. 5 schematically shows a top perspective view of the device layer, including the resonating/vibrating disk, in accordance with illustrative embodiments of the invention.

FIGS. 4 and 5 show additional details of the resonator 12. Specifically, FIG. 4 schematically shows a top perspective view of the bottom electrode/bottom layer 36 of the resonator 12 shown in FIGS. 3A and 3B, while FIG. 5 schematically shows a top perspective view of the top layer 38 of the resonator 12 shown in FIGS. 3A and 3B.

As shown in FIG. 4, the bottom electrode 22 of this example may comprise twelve separate bottom electrodes 22 that cooperate to actuate the disk 18 in the flexure mode. Specifically, the bottom electrode 22 shown in FIG. 4 has two sets of six electrodes 22 that each provide opposite force to the disk 18—using electrostatic signals, one set pushes while the other pulls. Both sets alternate (i.e., they are about 180 degrees out of phase) according to the actuation frequency. A first pad 28 controls one set of electrodes 22, while a second pad 28 controls the second set of electrodes 22. A pair of generally circular, concentric metallic traces 46A connects the bottom electrodes 22 in the desired manner. More particularly, each of the two traces 46A electrically connects every other electrode 22 to form the two sets.

FIG. 5 shows the electrical connections between the side electrodes 26 and the pads 28, as well as the top face of the disk 18. Unlike the schematic diagram of FIG. 3A, this embodiment shows twelve side electrodes 26. In a manner similar to the bottom electrode 22, three concentric, circular conductive traces 46B electrically connect various combinations of the side electrodes 26 to the pads 28.

Indeed, as noted above, illustrative embodiments also can be used in another mode, such as, among others, the in-plane modes discussed above with regard to FIGS. 1C and 1D. It should be reiterated that the plane used as a reference plane is the plane of the disk 18. Accordingly, rather than using the bottom and top electrodes 22, some embodiments use side electrodes 26 to cause the disk 18 to vibrate generally in-plane. Various of those side electrodes 26 are schematically shown in FIGS. 3A and 3B, as well as in other figures detailed below. Side actuation electrodes 26 can be positioned directly next to side sensing electrodes 26. Moreover, different numbers of side electrodes 26 can be used depending on the specification of the design.

While the design described above can be used as a bulk acoustic wave gyroscope, the inventors discovered that they could use the same structure as an accelerometer—thus forming a multi-sensor that senses either or both rotational and linear movement. To those ends, some or all of the noted actuation electrodes 22 or 26 discussed above generate electrostatic signals that cause the mass 18 to move in a translational mode—either a bulk translational mode or a non-bulk translational mode (e.g., see FIGS. 1A and 1B). The signal can be initially generated from an external or internal signal generator coupled with the resonator input pads 28. When moving in a translational mode, the resonator 12 can detect linear movement.

Figure 6A:
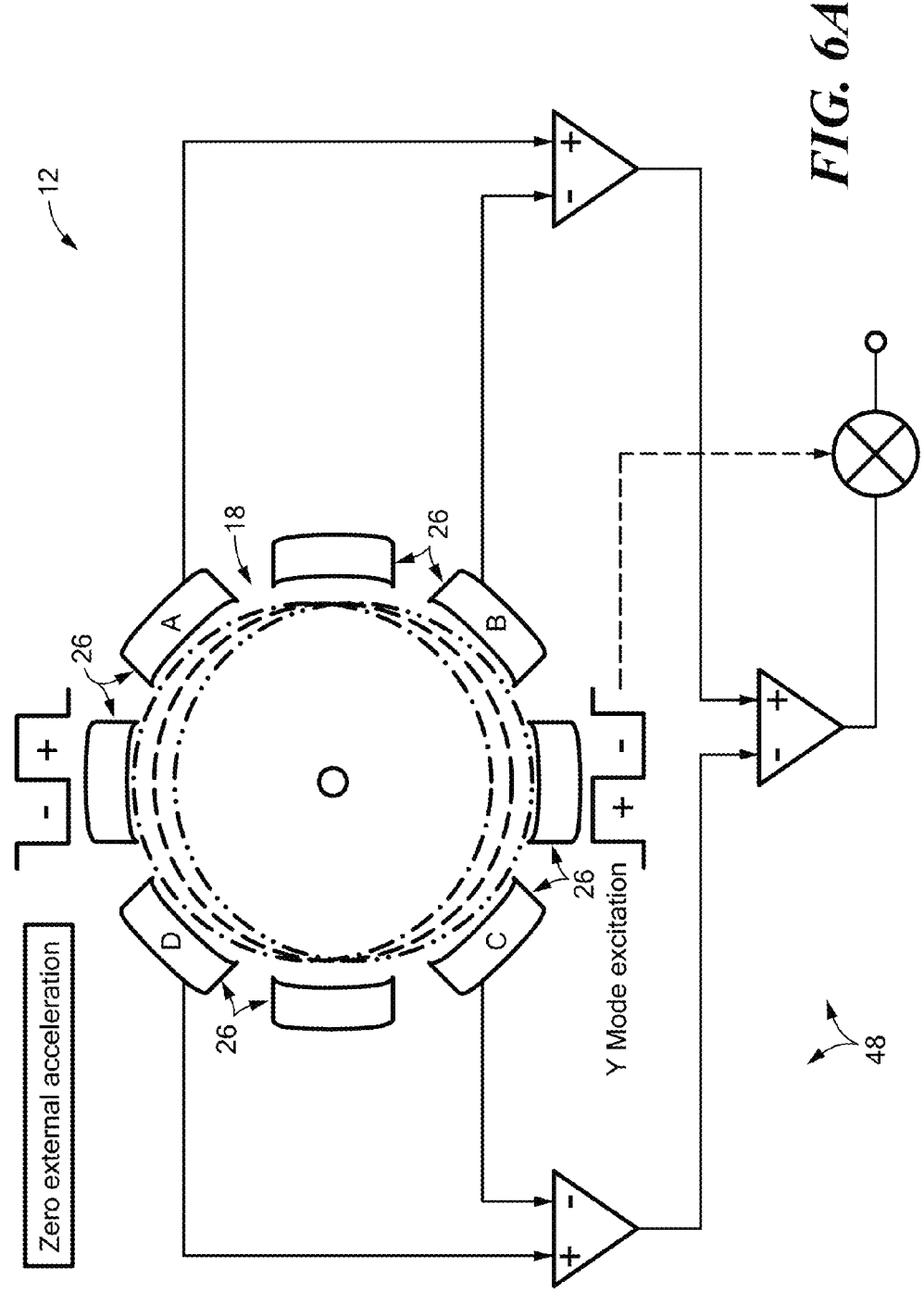
FIGS. 6A and 6B schematically show the resonator used as an X-axis accelerometer in accordance with illustrative embodiments.

More specifically, FIG. 6A schematically shows a top view of one embodiment of the resonator 12, which, in this example, at least is used as an X-axis accelerometer. To simplify this discussion, this and similar figures only show the disk 18, the sense and actuation electrodes (discussed in terms of the side electrodes 26, for example), and circuitry 48 for detecting the motion signals from the sense electrodes 26. For simplicity, the sense electrodes 26 are also identified in the figures as electrodes A, B, C, and D.

As shown, the resonator 12 has four sense electrodes 26 spaced 90 degrees apart, and four actuation electrodes 26 also spaced 90 degrees apart. The sense electrodes 26 are 45 degrees offset from the actuation electrodes 26 so that each electrode 26 is surrounded by the other kind of electrode 26.

For example, each actuation electrode 26 is surrounded by two sense electrodes 26. Indeed, it should be noted that discussion of this electrode 26 configuration is but one of a variety of different types of configurations. Various embodiments may have any reasonable number of electrodes 26, depending upon the specific design parameters. For example, some implementations may have 12, 18, or 24 of each type of electrode 26. Other implementations may have the same number of sense and actuation electrodes 26, or different numbers of sense and actuation electrodes 26. Those skilled in the art can make the appropriate selection of the number, orientation, and function of the electrodes 26.

This figure also attempts to demonstrate three different positions of the resonator disk 18 when the resonator chip 12 is not subjected to a linear acceleration. To that end, the disk 18 is represented in three different positions as it vibrates along the Y axis in the steady-state. Specifically, a top circle having dotted lines schematically shows the disk 18 as it is vibrating to its farthest positive Y-axis displacement point, while a corresponding bottom circle also having dotted lines schematically shows the disk 18 as it is vibrating to its farthest negative Y-axis displacement point. The center circle having dashed lines schematically shows the disk 18 between both states—in the center of the resonator 12. Accordingly, this figure shows the disk 18 vibrating up and down the Y-axis when not subjected to a linear acceleration in the X direction. Accordingly, this figure shows the resonator 12 moving/actuating the disk 18 in a translational mode.

FIG. 6A also shows the actuation signals received by the side actuation electrodes 26. Illustratively, these signals are square or sinusoidal waves. Not to be confused with the top and bottom electrodes discussed above with regard to FIGS. 2-5, these side electrodes 26 are referred to as top, bottom, right, and left electrodes 26 from the perspective of FIGS. 6A-9.

Accordingly, in this case, only the top and bottom actuation electrodes 26 receive the actuation signal, while the right and left electrodes 26 receive no actuation signal. In illustrative embodiments, the actuation signal received by the top actuation electrode 26 is about 180 degrees out of phase with the actuation signal received by the bottom actuation electrode 26. As known by those skilled in the art, these signals respectively generate equal and opposite electrostatic forces, causing the disk 18 to vibrate in the manner shown.

Like other parts of this resonator 12, one skilled in the art can select the appropriate frequency and phase, depending upon the application. Illustrative embodiments use a higher frequency for the gyroscopic bulk mode than it uses for the translational/accelerometer mode. For example, the actuation signal can actuate the disk 18 at a translational mode frequency of about 8 MHz, while actuating the disk 18 in an in-plane third-order elliptical bulk mode frequency of about 9.8 MHz. Of course, the resonator 12 can use other frequencies and thus, those frequencies are not intended to limit various embodiments of the invention. Preferred embodiments, however, did not set those frequencies as harmonics of each other. Instead, such embodiments set those frequencies so that they are non-harmonically related—i.e., neither of those frequencies is a harmonic of each other.

Figure 6B:
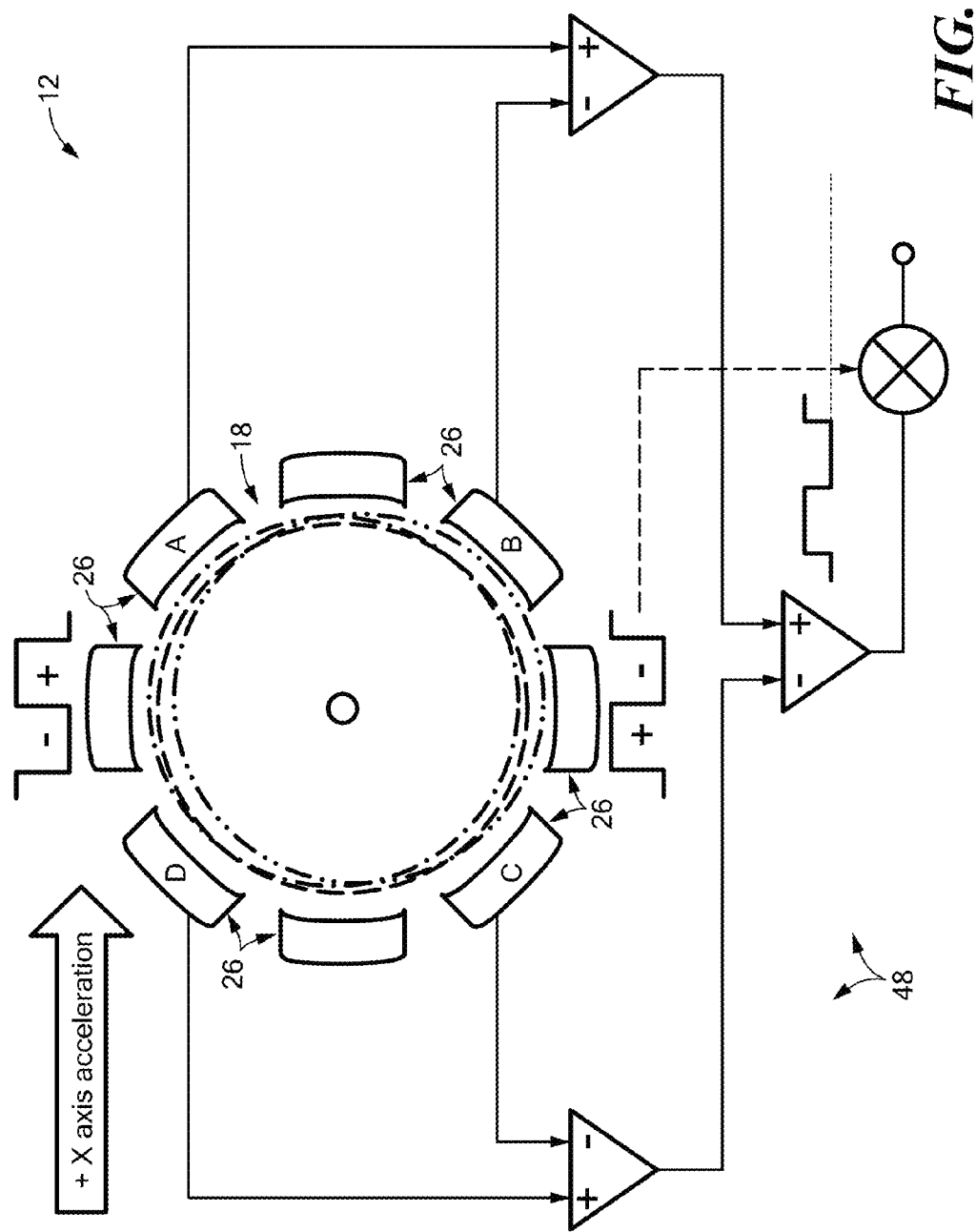

The disk 18 should continue to vibrate substantially along the Y-axis until the resonator 12 is subjected to a linear acceleration having at least a component along the X-axis. FIG. 6B schematically shows an example of how the disk 18 may respond to such an X-axis acceleration. As shown, in response to this specific acceleration, the disk 18 moves to the right and thus, closer to sense electrode B (shown here when translated at the extremes of the motion in the Y-axis direction) and closer to sense electrode A (not shown in this position, but in such a position when translated in the positive Y-axis direction and subjected to this X-axis acceleration).

Conventional circuitry 48 coupled with the sense electrodes 26 can detect disk movement and generate a movement signal representing the amount of linear acceleration. Both FIGS. 6A and 6B show some such circuitry 48, which simply uses conventional operational amplifiers to combine/subtract and amplify the changing capacitance signals formed by each electrode 26 and the disk 18. More specifically, the circuitry 48 shown includes a first operational amplifier that combines signals from sense electrodes A and B, and a second operational amplifier that similarly combines the capacitance signals from sense electrodes C and D. The outputs of those first and second operational amplifiers are fed into the inputs of a third operational amplifier, which is connected to the output pad(s) 28 of the resonator 12. External devices thus electrically couple with the output pads 28, receiving an output movement signal encoded with movement information, to determine the linear acceleration signal.

Other arrangements may be used to actuate the resonator 12 of FIG. 6A. For example, the outputs of electrodes B and C may be added to produce a first sum, and the outputs of the electrodes A and D may be added to produce a second sum. The clock for the actuation signal (with appropriate phase shifting), which in FIG. 6A drives the top and bottom electrodes 26, thus can be produced by subtracting the first sum from the second sum (or by subtracting the second sum from the first sum). This forces the resonator 12 to work at self-resonance and thus, more motion is available at a given voltage.

A corresponding technique may be used for X-mode excitation. In that case, the sum of the outputs of the A and B electrodes can be subtracted from the sum of the outputs of the C and D electrodes. Alternatively, the sum of the outputs of the C and D electrodes can be subtracted from the sum of the outputs for the A and B electrodes. For X and Y mode excitation/vibration, either one of those noted summed and subtracted signals can be used with a phase lock loop to produce the clock. Those skilled in the art can select the appropriate hardware (e.g., amplifiers) to effectuate this functionality.

Figure 7:
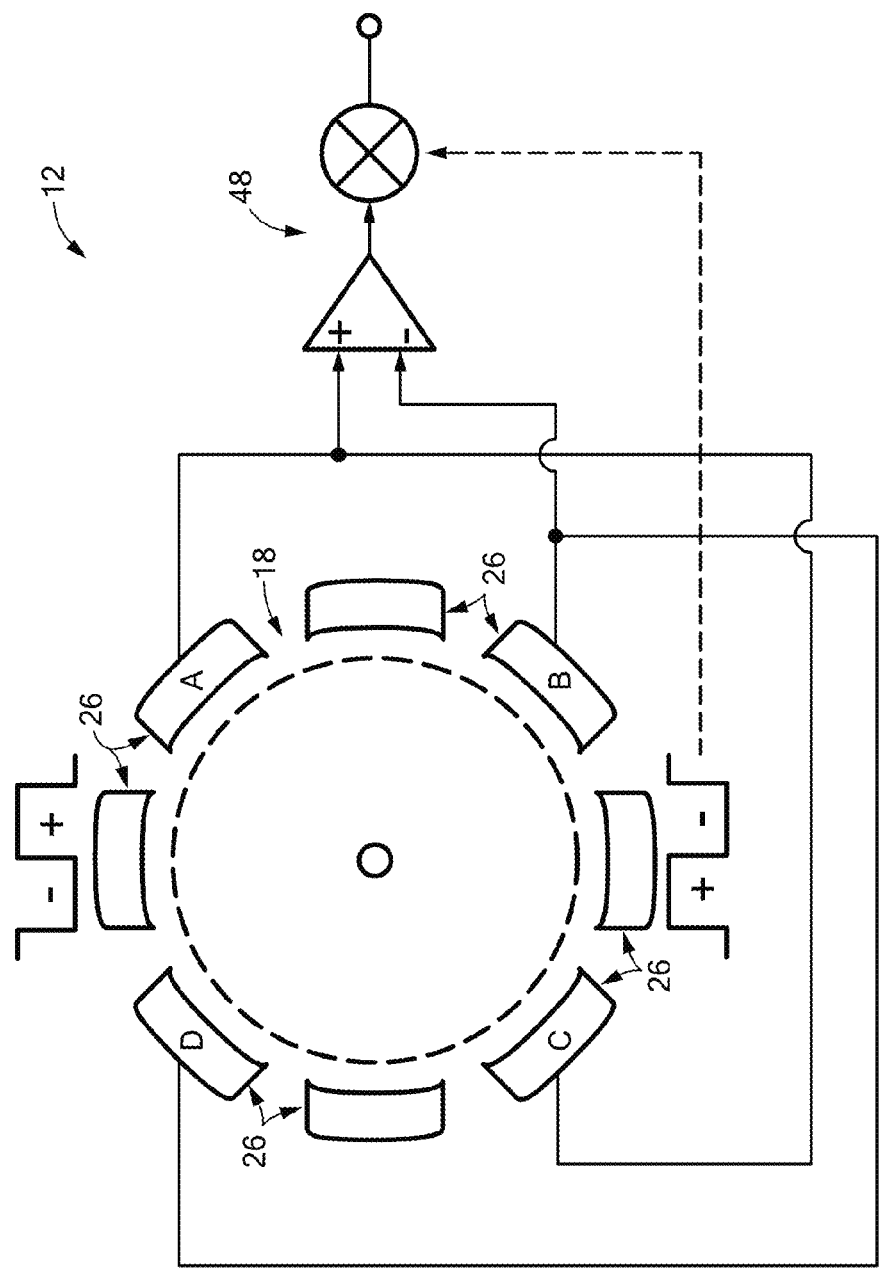
FIG. 7 schematically shows the resonator with alternative detection circuitry.

Some embodiments, however, require fewer or more operational amplifiers. FIG. 7, for example, shows the resonator 12 using only one operational amplifier to generate the output signal.

Figure 8:
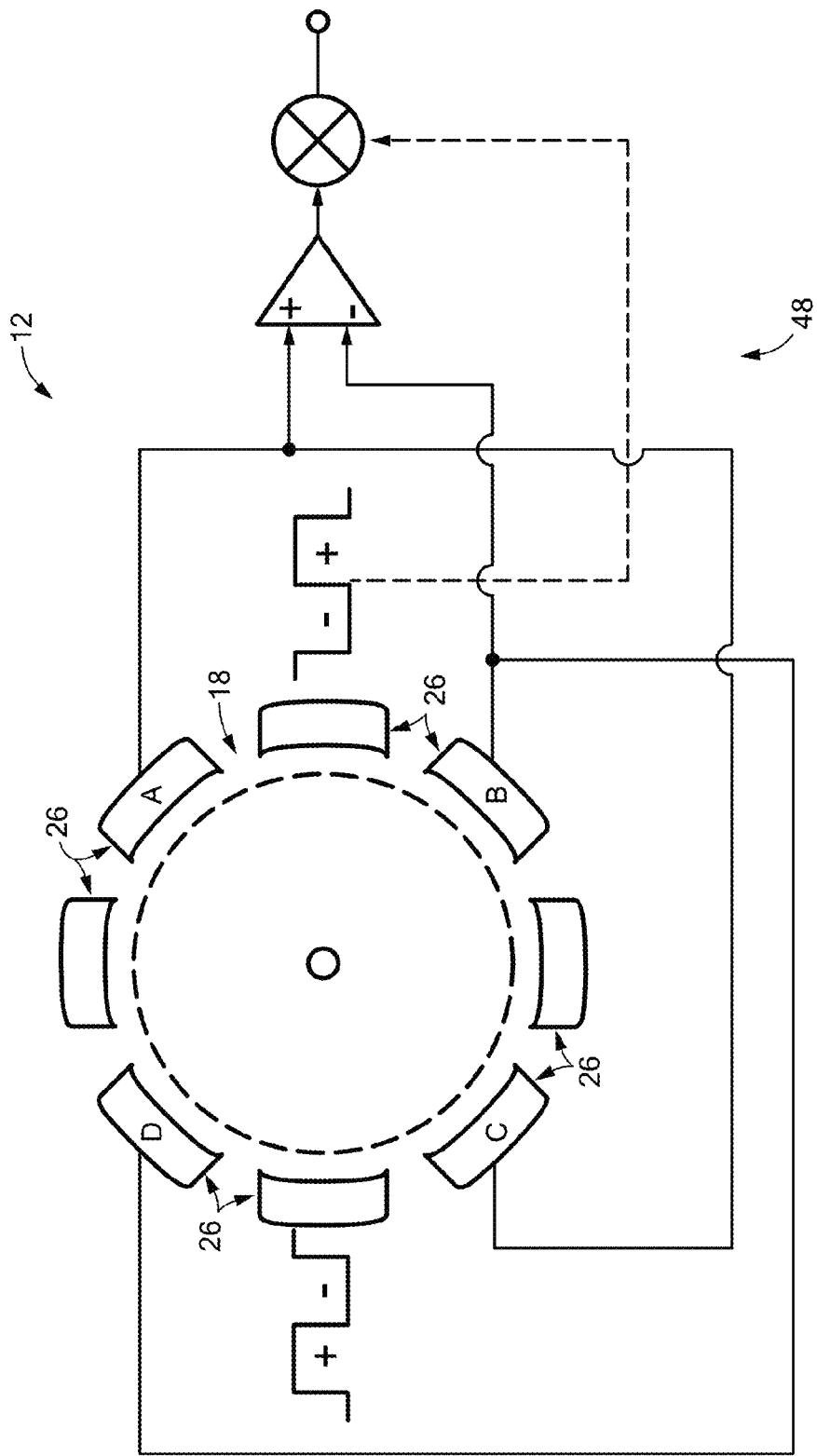
FIG. 8 schematically shows the resonator used as a Y-axis accelerometer in accordance with illustrative embodiments.

As a generally symmetrical device, the resonator 12 may detect acceleration along the Y-axis in much the same manner that it detects acceleration along the X-axis. To that end, FIG. 8 schematically shows one implementation of the resonator 12 configured to function as a Y-axis accelerometer. Specifically, like the X-axis accelerometer of FIGS. 6A and 6B, this resonator 12 also has the same sense electrodes A, B, C, and D. Rather than actuating the top and bottom actuation electrodes 26, however, this implementation actuates the left and right actuation electrodes 26 with actuation signals having the same frequency that are 180 degrees out of phase. Accordingly, in a complementary manner to the resonator mode shown in FIG. 6A, this mode translates the disk 18 along the X-axis, but detects acceleration along the Y-axis.

Figure 9:
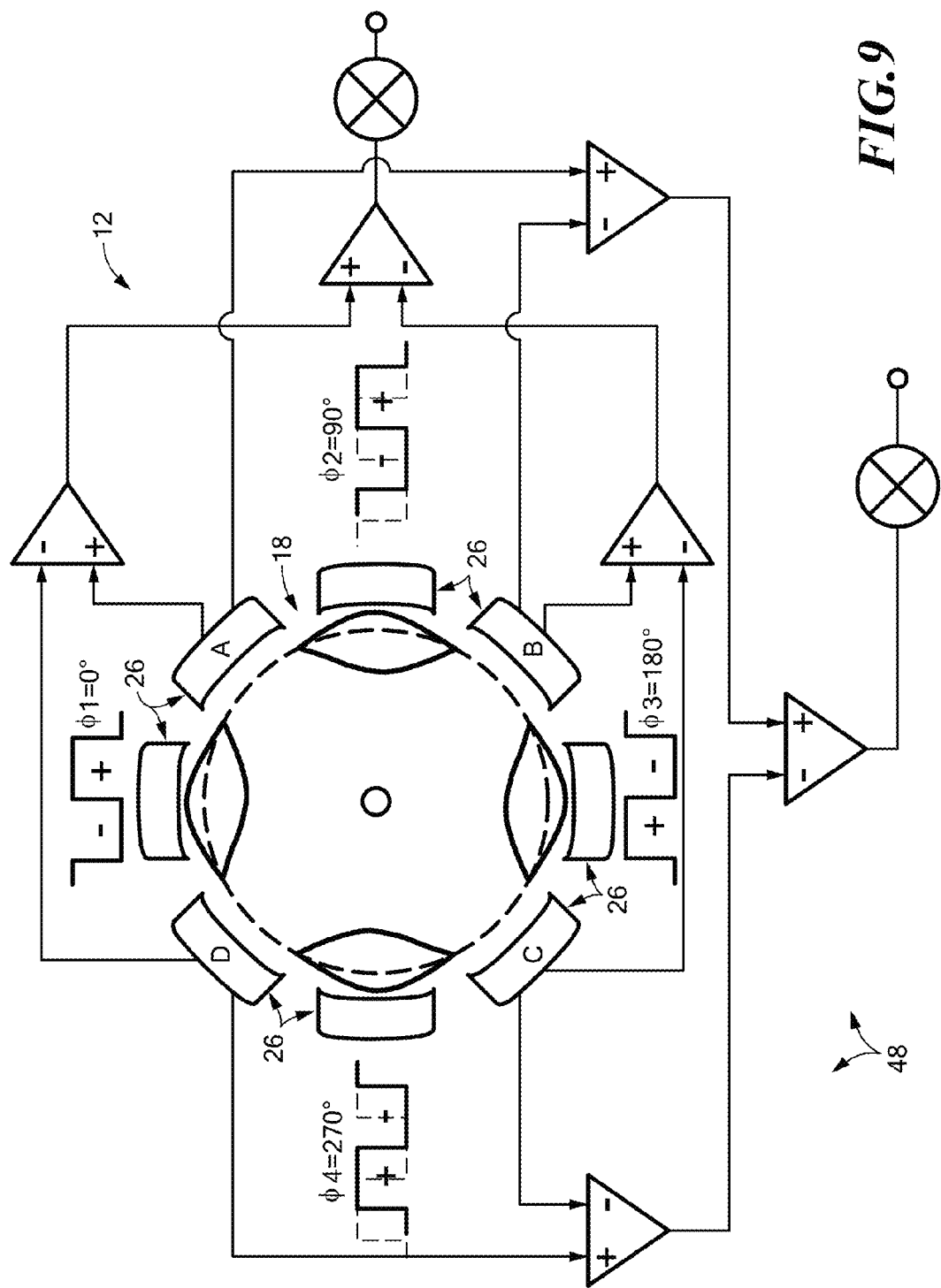
FIG. 9 schematically shows the resonator used as a two-axis accelerometer in accordance with illustrative embodiments.

As noted above, however, the resonator 12 can be configured to detect linear acceleration simultaneously along two or three axes. FIG. 9 shows one example, in which the resonator 12 is configured to detect linear acceleration along either or both the X and Y axes. This embodiment effectively combines the features described above with regard to the X-axis acceleration detection technique (FIGS. 6A, 6B, and 7) and Y-axis acceleration detection technique (FIG. 8).

As such, the top and bottom actuation electrodes 26 translate the disk 18 along the Y-axis, while the left and right actuation electrodes 26 translate the disk 18 along the X-axis. In illustrative embodiments, all four sense electrodes 26 effectively receive the same signal at the same frequency, but 90 degrees out of phase from its neighboring actuation electrode 26. For example, if the top actuation electrode 26 is considered to have a 0 degree phase, then the right actuation electrode 26 has a 90 degree phase, the bottom actuation electrode 26 has a 180 degree phase, and the left actuation electrode 26 has a 270 degree phase. Actuating with a 90 degree phase shift enables the subsequent electrical processes to distinguish between the X and Y signals at the same frequency.

These signals cause the disk 18 to move in a generally cylindrical orbit about the Z axis. More specifically, although not shown, some embodiments may support the disk 18 on one of its faces only. This can cause the disk 18 to orbit the Z axis in a somewhat cone-like manner; i.e., the disk and its bottom support 34 form the general shape of a cone as it orbits about the Z-axis. In other words, the axis of the disk forms an angle with the axis of the disk 18. While this should suffice in embodiments detecting linear acceleration only, it could present a problem for embodiments detecting rotational movement.

Figure 10:
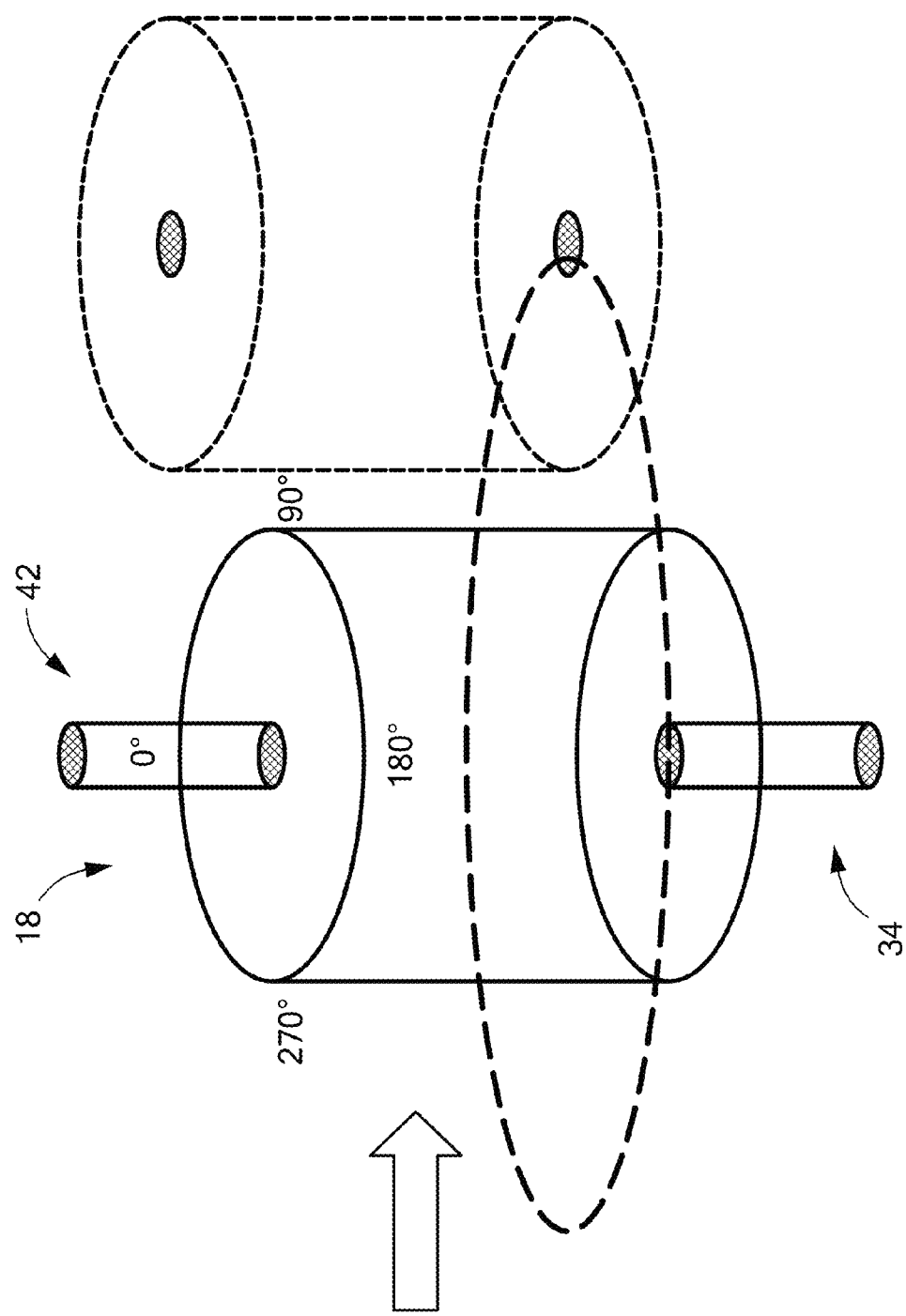
FIG. 10 schematically shows the cylindrical orbit of the disk within the resonator in accordance with illustrative embodiments.

Accordingly, various embodiments use the dual disk supporting structure—namely, the design having supports 34 and 42 on both the top and bottom faces of the disk 18—to substantially eliminate this undesirable cone-like rotational movement. Rather than enabling the disk 18 to move in a cone-like orbit, however, the second support causes the disk 18 to move about the Z axis in a manner that generally traces a cylinder. In other words, the axis of the disk 18 moves in a generally circular path within the X-Y plane about the Z-axis. This preferably causes the axis of the disk 18 to remain generally parallel with the Z-axis as it orbits. This movement or orbit is expected to maintain the disk 18 an appropriate position for accurately detecting rotational movement, if desired. FIG. 10 schematically shows one illustration of this orbital disk motion.

As noted above, illustrative embodiments can operate in either 1) a rotational movement sensing mode (i.e., in a gyroscope mode), 2) a linear movement sensing mode (e.g., in an accelerometer mode), or 3) in both a rotational and linear sensing mode. In fact, the linear movement sensing mode may include motion sensing along one, two, or three axes simultaneously. When operating in the combined mode, the resonator 12 actuates the disk 18 in both a translational mode and a different (bulk) mode substantially simultaneously, and, correspondingly, detects both linear and rotational movement.

Figure 11:
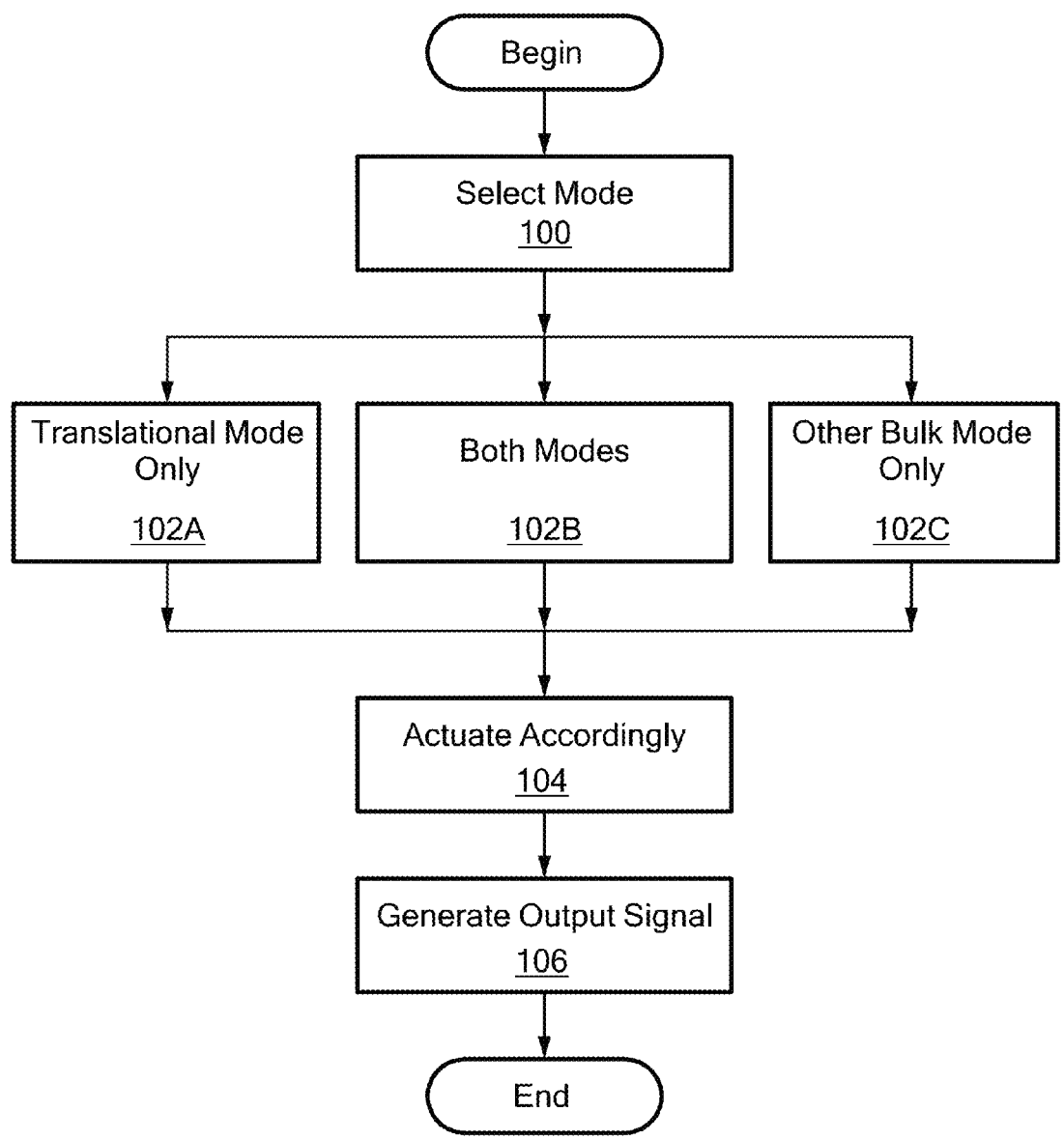
FIG. 11 shows a process of using the resonator in accordance with illustrative embodiments.

FIG. 11 shows a process of operating the resonator 12 in any of three functional modes (i.e., linear detection only, rotational detection only, or both linear and rotational detection) in accordance with one embodiment of the invention. This process discusses certain aspects by example, such as certain bulk modes. Of course, discussion of specific modes is for illustrative purposes only since other bulk modes can be used. The process begins at step 100, in which a designer or user selects the functional mode of operation. Accordingly, either 1) a translational mode (step 102A), 2) a (bulk) rotational mode (step 102C), or 3) a combined translational/linear-bulk/rotational mode (step 102B) can be selected. More specifically, a single piece of hardware, i.e., the resonator 12, can be used for its entire lifespan in any one of those three functional modes. Alternatively, that single piece of hardware 12 can be reconfigured multiple times during its lifespan to operate in different functional modes.

The process therefore continues to step 104, which actuates the disk 18 in an appropriate manner. To that end, each of the actuation electrodes 22 or 26 is coupled to some input, such as one or more of the pads 28, which directs received actuation signals to the appropriate actuation electrodes 26. Various embodiments may use the same actuation and sense electrodes 26 for respectively actuating and sensing when operating in the combined functional mode of step 102B. More specifically, one or more of the actuation electrodes 26 can receive both translational actuation signals and other bulk actuation signal (e.g., an in-plane third order elliptical bulk signal). To that end, illustrative embodiments may multiplex or interleaving the actuation signals onto the respective actuation electrodes 26. In a corresponding manner, shared sense electrodes 26 can use conventional filtering and other circuitry to separate the linear and rotational movement signals.

Other embodiments, however, may have dedicated actuation and sense electrodes 26 for each functional mode/actuation mode. For example, the plurality of actuation electrodes 26 may include one set of translational actuation electrodes 26 (e.g., eight) and another set of the different type of rotational (bulk) actuation electrodes 26 (e.g., eight). These two sets of actuation electrodes 26 may be evenly spaced about the disk 18. In a similar manner, the plurality of sense electrodes 26 may include one set of bulk sense electrodes 26 (e.g., eight) and a second set of translational sense electrodes 26 (e.g., eight). These two sets of sense electrodes 26 may be evenly spaced about the disk 18.

The process concludes at step 106, which generates an output signal having information relating to the movement of the resonator 12. As noted above, the prior noted circuitry 48 should substantially instantaneously generate the desired signal containing motion information.

Accordingly, a single bulk acoustic wave (BAW) MEMS device can be configured as either or both a gyroscope and/or an accelerometer. Due to the nature of BAW devices, in addition to eliminating the need for separate linear and rotational sensors, such a combined motion sensor/multi-sensor delivers improved output at greater efficiencies.

Although the above discussion discloses various exemplary embodiments of the invention, it should be apparent that those skilled in the art can make various modifications that will achieve some of the advantages of the invention without departing from the true scope of the invention.

What is claimed is:

1. A method of detecting motion using a resonator having a disk, wherein the resonator is configured to detect linear and rotational movement, the method comprising:
    moving the disk in a translational mode wherein an input signal moves the disk in a direction perpendicular to a direction of sensing;
    actuating the disk in a given bulk mode,
    wherein such moving and actuating causes the disk to move in the translational mode and the given bulk mode at substantially the same time; and
    producing one or more movement signals representing the detected linear and rotational movement when moving and actuating the disk in the translational mode and the given bulk mode.

2. The method as defined by claim 1 wherein the resonator has a top substrate and a bottom substrate, the disk has a top side and a bottom side, the resonator further has a top anchor coupling the top side of the disk with the top substrate, and the resonator further has a bottom anchor coupling the bottom side of the disk with the bottom substrate.

3. The method as defined by claim 1 wherein moving the disk in a translational mode comprises moving the disk in a generally cylindrical orbit within the resonator.

4. The method as defined by claim 1 wherein moving the disk in the translational mode comprises moving the disk in accordance with a translational frequency, and wherein actuating the disk in the given bulk mode comprises actuating the disk at a given frequency different than the translational frequency.

5. The method as defined by claim 4 wherein the translational frequency and given frequency are harmonically unrelated.

6. The method as defined by claim 1 wherein the translational mode is a discrete translational mode or a bulk translational mode.

7. The method as defined by claim 1 wherein moving the disk in the translational mode comprises moving the disk in an x-translational mode only.

8. The method as defined by claim 1 wherein moving the disk in the translational mode comprises moving the disk in both an x-translational mode and a y-translational mode.

9. The method as defined by claim 8 wherein moving the disk in the translational mode comprises moving the disk at substantially the same frequency in both the x-translational mode and the y-translational mode, wherein the frequency of the x-translational mode is out of phase with the y-translational mode.

10. A resonator comprising:
at least one substrate supporting a mass;
a plurality of actuation electrodes configured to actuate the mass;
a plurality of sense electrodes configured to detect mass movement;
an input operably coupled with the plurality of actuation electrodes, the input being configured to receive one or both a translational signal and a given bulk signal, the translational signal and the given bulk signal having different frequencies, wherein the resonator is configured such that the mass moves in a translational mode in a direction perpendicular to a direction of sensing in response to receipt of the translational signal, and wherein the resonator is configured such that the mass moves in a given bulk mode different from the translational mode in response to receipt of the given bulk signal,
the plurality of sense electrodes being configured to detect linear motion when the input receives the translational signal, the plurality of sense electrodes being configured to detect rotational motion when the input receives the given bulk signal, the plurality of sense electrodes being configured to detect both linear and rotational motion when the input receives both the translational signal and the given bulk signal; and
an output operably coupled with the plurality of sense electrodes, the output being configured to forward a movement signal representing detected movement.

11. The resonator as defined by claim 10 wherein the sense electrodes are configured to detect linear motion in at least two orthogonal directions when the input receives the translational signal.

12. The resonator as defined by claim 10 wherein the translational signal and the given bulk signal are harmonically unrelated, and wherein the input is configured to receive both the translational signal and the given bulk signal at substantially the same time or at different times.

13. The resonator as defined by claim 10 further comprising a top anchor connecting a top side of the mass with a top substrate and a bottom anchor connecting a bottom side of the mass with a bottom substrate.

14. The resonator as defined by claim 13 wherein the mass has a centroid, and wherein the top and bottom anchors extend from the centroid of the mass.

15. The resonator as defined by claim 10 further comprising a signal generator coupled with the input, the signal generator configured to produce the translational signal and the given bulk signal at separate times or at the same time.

16. A method of detecting motion using a resonator having a mass, the resonator being configured to generate linear movement output information if the mass is actuated in a translational mode, the resonator being configured to generate rotational movement output information if the mass is actuated in a given bulk mode, the method comprising:
moving the mass in the translational mode wherein an input signal moves the disk in a direction perpendicular to a direction of sensing if a translational mode signal is received, the translational signal having a translational frequency,
moving the mass in the given bulk mode if a given bulk mode signal is received, the given bulk signal having a given bulk frequency,
the given bulk mode being different than the translational mode,
the translational frequency and given bulk frequency being different and harmonically unrelated,
detecting linear movement if in the translational mode;
detecting rotational movement if in the given bulk mode; and
generating at least one signal having data relating to the detected movement.

17. The method as defined by claim 16 wherein moving the mass comprises moving the mass in a generally cylindrical orbit within the resonator when in the translational mode.

18. The method as defined by claim 16 wherein moving the mass in the translational mode comprises moving the mass in both the x-translational mode and the y-translational mode.

19. The method as defined by claim 18 wherein moving the mass in the translational mode comprises moving the mass at substantially the same frequency in both of the x-translational mode and the y-translational mode, the frequency of the x-translational mode being out of phase with the frequency of the y-translational mode.

20. The method as defined by claim 16 wherein the mass comprises a disk, the disk comprising a top, a bottom, and a centroid, the method further comprising supporting the disk at its top and bottom at the centroid.

* * * * *